(12) United States Patent
Kurahashi

(10) Patent No.: US 9,374,544 B2
(45) Date of Patent: Jun. 21, 2016

(54) IMAGE CAPTURE DEVICE, IMAGE PROCESSING METHOD, AND PROGRAM

(71) Applicant: FUJIFILM Corporation, Toyko (JP)

(72) Inventor: Hidekazu Kurahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/711,863

(22) Filed: May 14, 2015

(65) Prior Publication Data

US 2015/0244955 A1 Aug. 27, 2015

Related U.S. Application Data

(63) Continuation of application No. PCT/JP2013/080375, filed on Nov. 11, 2013.

(30) Foreign Application Priority Data

Dec. 7, 2012 (JP) .................................. 2012-268183

(51) Int. Cl.
| | |
|---|---|
| *H04N 5/369* | (2011.01) |
| *H04N 9/07* | (2006.01) |
| *H04N 9/04* | (2006.01) |
| *G02B 5/20* | (2006.01) |

(Continued)

(52) U.S. Cl.
CPC .................. *H04N 5/369* (2013.01); *G02B 5/20* (2013.01); *G02B 5/201* (2013.01); *G02B 27/0018* (2013.01); *H04N 5/243* (2013.01); *H04N 5/359* (2013.01); *H04N 9/045* (2013.01); *H04N 9/07* (2013.01); *H04N 2209/045* (2013.01)

(58) Field of Classification Search
None
See application file for complete search history.

(56) References Cited

U.S. PATENT DOCUMENTS

| | | | | |
|---|---|---|---|---|
| 7,760,256 B2 * | 7/2010 | Kanamori | .............. | H04N 9/045 348/222.1 |
| 7,812,382 B2 * | 10/2010 | Iida | ................... | H01L 27/14603 257/292 |

(Continued)

FOREIGN PATENT DOCUMENTS

| | | | |
|---|---|---|---|
| JP | 2005-333251 A | 12/2005 |
| JP | 2007-142697 A | 6/2007 |
| JP | 2008-289034 A | 11/2008 |

OTHER PUBLICATIONS

International Search Report, issued in PCT/JP2013/080375, dated Feb. 10, 2014.

(Continued)

*Primary Examiner* — Michael Osinski
(74) *Attorney, Agent, or Firm* — Birch, Stewart, Kolasch & Birch, LLP

(57) ABSTRACT

According to the present invention, provided is an image capture device, an image processing method, and a non-transitory computer readable medium storing a program capable of detecting a direction of incidence of abnormal oblique incident light and reducing an effect of color mixture caused by the abnormal oblique incident light. An image capture device 10 includes an abnormal oblique-incident-light detection portion 34 and a correction portion 36. An abnormal oblique-incident-light detection portion 34 detects abnormal oblique incident light originated from a first direction by comparing the pixel data of first first-direction same-color adjacent pixels, second first-direction same-color adjacent pixels, first first-direction different-color adjacent pixels, and second first-direction different-color adjacent pixels.

20 Claims, 22 Drawing Sheets

(51) Int. Cl.
*H04N 5/243* (2006.01)
*G02B 7/00* (2006.01)
*H04N 5/359* (2011.01)
*G02B 27/00* (2006.01)

(56) References Cited

U.S. PATENT DOCUMENTS

| | | | | |
|---|---|---|---|---|
| 8,130,293 | B2* | 3/2012 | Kanamori | H04N 9/045 348/222.1 |
| 8,564,700 | B2* | 10/2013 | Kanamori | H01L 27/14621 348/273 |
| 8,742,309 | B2* | 6/2014 | Agranov | G01S 3/782 250/208.1 |
| 8,878,970 | B2* | 11/2014 | Tanaka | H04N 9/045 348/222.1 |
| 9,160,990 | B2* | 10/2015 | Kawai et al. | H04N 5/23212 |
| 9,172,925 | B2* | 10/2015 | Sugawara | G02B 7/34 |
| 9,184,196 | B2* | 11/2015 | Tanaka | H04N 9/045 |
| 9,204,020 | B2* | 12/2015 | Kawai | H04N 9/07 |
| 9,264,636 | B2* | 2/2016 | Sugawara | H04N 5/3572 |
| 2007/0146511 | A1 | 6/2007 | Kinoshita et al. | |
| 2011/0076001 | A1* | 3/2011 | Iwasaki | G03B 7/099 396/114 |
| 2013/0201388 | A1* | 8/2013 | Hsiao | H04N 5/357 348/360 |
| 2013/0286261 | A1* | 10/2013 | Tanaka | H04N 5/3728 348/280 |
| 2013/0329117 | A1* | 12/2013 | Kimura | H04N 5/2254 348/344 |
| 2014/0211076 | A1* | 7/2014 | Inoue | G02B 7/34 348/349 |
| 2014/0267839 | A1* | 9/2014 | Nishimaki | H04N 5/367 348/246 |
| 2014/0347533 | A1* | 11/2014 | Toyoda | H04N 9/045 348/294 |
| 2015/0009367 | A1* | 1/2015 | Kobayashi | G02B 7/34 348/240.3 |
| 2015/0015749 | A1* | 1/2015 | Ito | H01L 27/14629 348/273 |
| 2015/0042858 | A1* | 2/2015 | Kokubun | H01L 27/14625 348/302 |
| 2015/0062386 | A1* | 3/2015 | Sugawara | G02B 7/34 348/241 |
| 2015/0076643 | A1* | 3/2015 | Kikuchi | H01L 27/14621 257/432 |
| 2015/0077597 | A1* | 3/2015 | Furuta | H04N 5/359 348/242 |
| 2015/0090909 | A1* | 4/2015 | Shih | G01J 1/0266 250/578.1 |
| 2015/0156405 | A1* | 6/2015 | Izawa | G02B 7/34 348/246 |
| 2015/0187843 | A1* | 7/2015 | Hatano | H01L 27/1464 257/40 |
| 2015/0192758 | A1* | 7/2015 | Yamagata | G02B 5/3025 348/360 |
| 2015/0237273 | A1* | 8/2015 | Sawadaishi | H04N 5/3572 348/234 |
| 2015/0244926 | A1* | 8/2015 | Inoue | G02B 7/34 348/350 |
| 2015/0244957 | A1* | 8/2015 | Kim | H04N 5/3696 348/302 |
| 2015/0271461 | A1* | 9/2015 | Hayashi | H04N 9/07 348/223.1 |
| 2015/0288901 | A1* | 10/2015 | Tanaka | H01L 27/14605 250/208.1 |
| 2015/0326838 | A1* | 11/2015 | Kawai | H04N 9/045 348/280 |
| 2016/0035770 | A1* | 2/2016 | Ahn | H01L 27/1463 257/432 |

OTHER PUBLICATIONS

Written Opinion of the International Searching Authority, issued in PCT/JP2013/080375, dated Feb. 10, 2014.

* cited by examiner

FIG. 4A

| Gr | Gb | Gr | Gb |
|----|----|----|----|
| Gr | Gb | Gr | Gb |
| Gr | Gb | Gr | Gb |
| Gr | Gb | Gr | Gb |

FIG. 4B

| Gr | Gr | Gr | Gr |
|----|----|----|----|
| Gb | Gb | Gb | Gb |
| Gr | Gr | Gr | Gr |
| Gb | Gb | Gb | Gb |

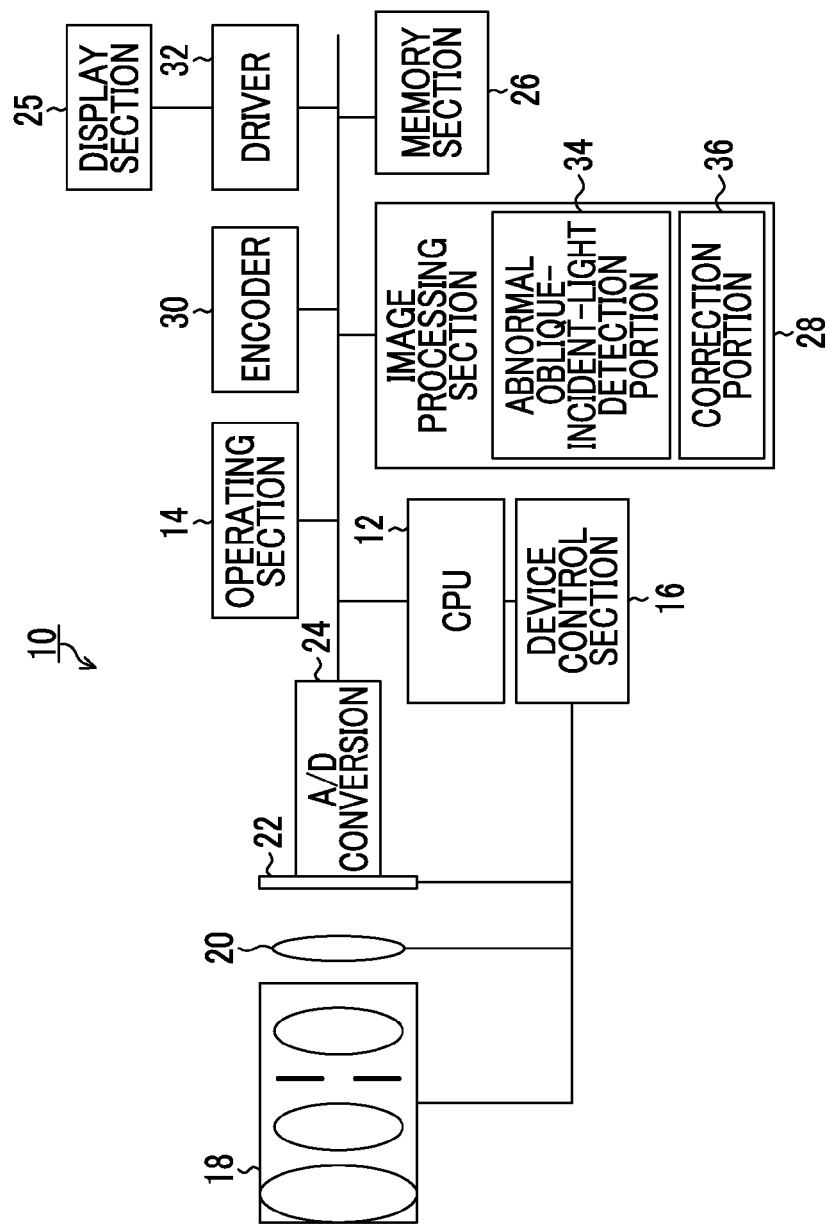

← ABNORMAL OBLIQUE INCIDENT LIGHT

← ABNORMAL OBLIQUE INCIDENT LIGHT

IMAGE CAPTURE DEVICE, IMAGE PROCESSING METHOD, AND PROGRAM

CROSS REFERENCE TO RELATED APPLICATIONS

This application is a Continuation of PCT International Application No. PCT/JP2013/080375 filed on Nov. 11, 2013, which claims priority under 35 U.S.C §119(a) to Patent Application No. 2012-268183 filed in Japan on Dec. 7, 2012, all of which are hereby expressly incorporated by reference into the present application.

BACKGROUND OF THE INVENTION

1. Field of the Invention

The present invention relates to an image capture device, an image processing method, and a non-transitory computer readable medium storing a program. In particular, the present invention relates to a technology of correcting an effect of color mixture caused by abnormal oblique incident light.

2. Description of the Related Art

In the related art of digital cameras, the following problem is known: incident light is reflected from lenses and a camera main body, light (abnormal oblique incident light) incident obliquely is generated, and thereby flares or ghosts, which are images that should not have originally existed, occur. Further, it is also known that, in accordance with occurrence of ghosts, there is an effect of color mixture caused by abnormal oblique incident light.

JP2005-333251A discloses a technology of a color imaging element of which a color filter array is a Bayer array. In the technology, color noise caused by ghosts is detected from differences in levels of output values of same-color pixels (GR and GB, which are regarded as Gr and Gb in description of the present specification) between adjacent lines in a region corresponding to a reference pattern stored in advance among output values of the pixels of the imaging element, and color noise is suppressed through correction.

Further, JP2008-289034A discloses a technology of removing ghosts by subtracting a simulation image, which has a ghost image component generated on the basis of information of the ghost image component, from an original image. On the other hand, JP2007-142697A discloses a technology of performing color mixture correction on a signal of observed pixels by using correction parameters independent for each direction toward the adjacent pixels and differences between output values of a plurality of surrounding pixels adjacent to the observed pixels and output values of the observed pixels as correction targets when color mixture correction is performed.

However, in the technology disclosed in JP2005-333251A, there is such a problem that the incidence direction of the abnormal oblique incident light of ghosts cannot be determined and appropriate correction in the incidence direction cannot be performed.

Further, in the technology disclosed in JP2008-289034A, there is a problem that simulation should be performed in order to detect ghosts.

Furthermore, in the technology disclosed in JP2007-142697A, there is a problem that presence or absence of abnormal oblique incident light and the incidence direction cannot be determined.

SUMMARY OF THE INVENTION

An object of the present invention is to provide an image capture device and an image processing method capable of detecting the incidence direction of the abnormal oblique incident light and reducing an effect of color mixture caused by the abnormal oblique incident light.

In order to achieve the object, according to an aspect of the present invention, there is provided an image capture device including: an imaging element that has a plurality of pixels arranged in a first direction and a second direction perpendicular to the first direction, where each of the plurality of pixels has a color filter and a photodiode which receives light transmitted through the color filter and outputs pixel data; an abnormal oblique-incident-light detection unit that detects incidence of abnormal oblique incident light onto the imaging element on the basis of the pixel data; and a correction unit that corrects the pixel data of the pixels having the photodiodes, onto which the abnormal oblique incident light is incident, on the basis of a detection result of the abnormal oblique-incident-light detection unit, in which the plurality of pixels includes a first first-direction same-color adjacent pixel constituted of a pixel which has the color filter with a first color and is adjacent to a pixel having the color filter with the first color in the first direction, a second first-direction same-color adjacent pixel constituted of a pixel which have the color filter with a first color and is adjacent to a pixel having the color filter with the first color in the first direction, a first first-direction different-color adjacent pixel constituted of a pixel which has the color filter with the first color and is adjacent to a pixel having the color filter with a different color from the first color in the first direction, and a second first-direction different-color adjacent pixel constituted of a pixel which has the color filter with the first color and is adjacent to pixel having the color filter with the different color from the first color in the first direction, and in which the abnormal oblique-incident-light detection unit detects abnormal oblique incident light, which is incident onto the imaging element in the first direction, on the basis of the pixel data of the first first-direction same-color adjacent pixel, the second first-direction same-color adjacent pixel, the first first-direction different-color adjacent pixel, and the second first-direction different-color adjacent pixel.

Thereby, it is possible to detect incidence of the abnormal oblique incident light on the basis of the pixel data, and it is possible to determine the incidence direction of the abnormal oblique incident light.

In the image capture device, it is preferable that the plurality of pixels includes a first second-direction same-color adjacent pixel constituted of a pixel which has the color filter with the first color and is adjacent to a pixel having the color filter with the first color in the second direction, a second second-direction same-color adjacent pixel constituted of a pixel which has the color filter with the first color and is adjacent to a pixel having the color filter with the first color in the second direction, a first second-direction different-color adjacent pixel constituted of a pixel which has the color filter with the first color and is adjacent to a pixel having the color filter with a different color from the first color in the second direction, and a second second-direction different-color adjacent pixel constituted of a pixel which has the color filter with the first color and is adjacent to a pixel having the color filter with the different color from the first color in the second direction. In addition, it is preferable that the abnormal oblique-incident-light detection unit detects abnormal oblique incident light, which is incident onto the imaging element in the second direction, on the basis of the pixel data of the first second-direction same-color adjacent pixel, the second second-direction same-color adjacent pixel, the first second-direction different-color adjacent pixel, and the second second-direction different-color adjacent pixel.

Thereby, also regarding the second direction, it is possible to detect incidence of the abnormal oblique incident light, and it is possible to determine the incidence direction.

In the image capture device, it is preferable that the abnormal oblique-incident-light detection unit detects the abnormal oblique incident light, which is incident onto the imaging element in the first direction, in case where the pixel data of the first first-direction same-color adjacent pixel and the pixel data of the second first-direction same-color adjacent pixel are the same, and the pixel data of the first first-direction different-color adjacent pixel and the second first-direction different-color adjacent pixel are different from the pixel data of the first first-direction same-color adjacent pixel and the second first-direction same-color adjacent pixel. In addition, it is preferable that the abnormal oblique-incident-light detection unit detects the abnormal oblique incident light, which is incident onto the imaging element in the second direction, in case where the pixel data of the first second-direction same-color adjacent pixel and the pixel data of the second second-direction same-color adjacent pixel are the same, and the pixel data of the first second-direction different-color adjacent pixel and the second second-direction different-color adjacent pixel are different from the pixel data of the first second-direction same-color adjacent pixel and the second second-direction same-color adjacent pixel.

In the image capture device, it is preferable that, assuming that N is an integer equal to or greater than 3 and M is an integer equal to or greater than 3, the plurality of pixels includes a plurality of basic array pixel groups each of which has an array of N×M pixels arranged in the first direction and the second direction and which are arranged in parallel in the first direction and the second direction. In addition, it is preferable that each of the basic array pixel groups includes the first first-direction same-color adjacent pixel, the second first-direction same-color adjacent pixel, the first first-direction different-color adjacent pixel, the second first-direction different-color adjacent pixel, the first second-direction same-color adjacent pixel, the second second-direction same-color adjacent pixel, the first second-direction different-color adjacent pixel, and the second second-direction different-color adjacent pixel.

Thereby, it is possible to detect the incidence of the abnormal oblique incident light on the entire surface of the imaging element.

In the image capture device, it is preferable that the plurality of pixels includes a first first-color pixel and a second first-color pixels that have color filters with the first color, are adjacent in a positive direction of the first direction to pixels having color filters with the same color, and are adjacent in a negative direction of the first direction to pixels having color filters with different colors, a third first-color pixels and a fourth first-color pixel that have color filters with the first color, are adjacent in the negative direction of the first direction to pixels having color filters with the same color, and are adjacent in the positive direction of the first direction to pixels having color filters with the different colors, a fifth first-color pixel and a sixth first-color pixel that have color filters with the first color, are adjacent in a positive direction of the second direction to pixels having color filters with the same color, and are adjacent in a negative direction of the second direction to pixels having color filters with the different colors, and a seventh first-color pixel and an eighth first-color pixel that have color filters with the first color, are adjacent in the negative direction of the second direction to pixels having color filters with the same color, and are adjacent in the positive direction of the second direction to pixels having color filters with the different colors. In addition, it is preferable that each of the first first-direction same-color adjacent pixel, the second first-direction same-color adjacent pixel, the first first-direction different-color adjacent pixel, and the second first-direction different-color adjacent pixel is constituted by any of the first first-color pixel, the second first-color pixel, the third first-color pixels, and the fourth first-color pixel. In addition, it is preferable that each of the first second-direction same-color adjacent pixel, the second second-direction same-color adjacent pixel, the first second-direction different-color adjacent pixel and the second second-direction different-color adjacent pixel is constituted by any of the fifth first-color pixel, the sixth first-color pixel, the seventh first-color pixel, and the eighth first-color pixel. In addition, the abnormal oblique-incident-light detection unit determines which of the positive and negative directions of the first direction the abnormal oblique incident light, which is incident onto the imaging element in the first direction, is incident in, on the basis of the pixel data of the first first-color pixel, the second first-color pixel, the third first-color pixel, and the fourth first-color pixel. In addition, it is preferable that the abnormal oblique-incident-light detection unit determines which of the positive and negative directions of the second direction the abnormal oblique incident light, which is incident onto the imaging element in the second direction, is incident in, on the basis of the pixel data of the fifth first-color pixel, the sixth first-color pixel, the seventh first-color pixel, and the eighth first-color pixel.

Thereby, it is possible to detect the incidence of the abnormal oblique incident light in the positive direction and negative direction of the first direction and/or in the positive direction and negative direction of the second direction. In addition, it is possible to detect the incidence direction of the abnormal oblique incident light in the positive direction and negative direction of the first direction and/or in the positive direction and negative direction of the second direction.

In the image capture device, it is preferable that the correction unit corrects the pixel data of the pixels having the photodiodes, onto which the abnormal oblique incident light is incident, by using the pixel data of pixels, each of which outputs the same pixel data, among the first first-color pixel, the second first-color pixel, the third first-color pixel, and the fourth first-color pixel, in case where the abnormal oblique-incident-light detection unit detects the abnormal oblique incident light which is incident onto the imaging element in the first direction. In addition, it is preferable that the correction unit corrects the pixel data of the pixels having the photodiodes, onto which the abnormal oblique incident light is incident, by using the pixel data of pixels, each of which outputs the same pixel data, among the fifth first-color pixel, the sixth first-color pixel, the seventh first-color pixel, and the eighth first-color pixel, in case where the abnormal oblique-incident-light detection unit detects the abnormal oblique incident light which is incident onto the imaging element in the second direction.

Thereby, it is possible to remove variation in the pixel data of the pixels having filters with the same color due to an effect of color mixture caused by the abnormal oblique incident light.

In the image capture device, it is preferable that a color of the color filter of the pixel, which has the color filter with the different color from the first color and is adjacent in the first direction to the first first-direction different-color adjacent pixel, is different from a color of the color filter of the pixel, which has the color filter with the different color from the first color and is adjacent in the first direction to the second first-direction different-color adjacent pixel. In addition, it is preferable that a color of the color filter of the pixel, which has the color filter with the different color from the first color and is adjacent in the second direction to the first second-direction different-color adjacent pixel, is different from a color of the color filter of the pixel, which has the color filter with the different color from the first color and is adjacent in the second direction to the second second-direction different-color adjacent pixel.

Thereby, when the abnormal oblique incident light is incident in the first direction, color mixture has a different effect on each of the first first-direction different-color adjacent pixels and the second first-direction different-color adjacent pixels. Therefore, it is possible to easily determine the incidence direction of the abnormal oblique incident light.

In the image capture device, it is preferable that the plurality of pixels includes first-color pixel groups each of which is constituted of pixels that have color filters with the first color and are formed in an array of 2×2 pixels in the first direction and the second direction. In addition, it is preferable that the pixels constituting the first-color pixel groups include the first first-direction same-color adjacent pixel, the second first-direction same-color adjacent pixel, the first first-direction different-color adjacent pixel, and the second first-direction different-color adjacent pixel, and include the first second-direction same-color adjacent pixel, the second second-direction same-color adjacent pixel, the first second-direction different-color adjacent pixel, and the second second-direction different-color adjacent pixel.

In the image capture device, it is preferable that the plurality of pixels includes a plurality of basic array pixel groups each of which is constituted of pixels that are formed in an array of 6×6 pixels in the first direction and the second direction, the plurality of basic array pixel groups being arranged in parallel in the first direction and the second direction. In addition, it is preferable that each of the basic array pixel groups includes two first sub-arrays and two second sub-arrays each of which is constituted of pixels formed in an array of 3×3 pixels in the first direction and the second direction. In addition, it is preferable that each first sub-array has a single pixel which has a color filter with the first color and is disposed at the center of the array, four pixels which have color filters with the first color and are disposed at four corners, two pixels which have color filters with a second color and are disposed in the first direction with the single pixel, which has the color filter with the first color and is disposed at the center of the array, interposed therebetween, and two pixels which have color filters with a third color and are disposed in the second direction with the single pixel, which has the color filter with the first color and is disposed at the center of the array, interposed therebetween. In addition, it is preferable that each second sub-array has a single pixel which has a color filter with the first color and is disposed at the center of the array, four pixels which have color filters with the first color and are disposed at four corners, two pixels which have color filters with the third color and are disposed in the first direction with the single pixel, which has the color filter with the first color and is disposed at the center of the array, interposed therebetween, and two pixels which have color filters with the second color and are disposed in the second direction with the single pixel, which has the color filter with the first color and is disposed at the center of the array, interposed therebetween. In addition, it is preferable that the first sub-arrays are disposed to be adjacent to the second sub-arrays in the first direction and the second direction. In addition, it is preferable that each first-color pixel group is constituted of the two first sub-arrays and the two second sub-arrays.

In the image capture device, it is preferable that the plurality of pixels includes a plurality of basic array pixel groups each of which is constituted of pixels that are formed in an array of 4×4 pixels in the first direction and the second direction, the plurality of basic array pixel groups being arranged in parallel in the first direction and the second direction. In addition, it is preferable that each of the basic array pixel groups includes two first sub-arrays and two second sub-arrays each of which is constituted of pixels formed in an array of 2×2 pixels in the first direction and the second direction. In addition, it is preferable that each first sub-array is constituted of four pixels having color filters with the first color, and each second sub-array is constituted of two pixels having color filters with a second color and two pixels having color filters with a third color. In addition, it is preferable that the first sub-arrays are disposed to be adjacent to the second sub-arrays in the first direction and the second direction. In addition, it is preferable that each first-color pixel group is constituted of the first sub-array.

In the image capture device, it is preferable that the plurality of pixels includes a plurality of basic array pixel groups each of which is constituted of pixels that are formed in an array of 6×6 pixels in the first direction and the second direction, the plurality of basic array pixel groups being arranged in parallel in the first direction and the second direction. In addition, it is preferable that each of the basic array pixel groups includes two first sub-arrays and two second sub-arrays each of which is constituted of pixels formed in an array of 3×3 pixels in the first direction and the second direction. In addition, it is preferable that each first sub-array has a single pixel which has a color filter with a second color and is disposed at the center of the array, four pixels which have color filters with a third color and are disposed at four corners, and four pixels which have color filters with the first color and which are disposed between each of pixels at the four corners. In addition, it is preferable that each second sub-array has a single pixel which has a color filter with the third color and is disposed at the center of the array, four pixels which have color filters with the second color and are disposed at four corners, and four pixels which have color filters with the first color and which are disposed between each of pixels at the four corners. In addition, it is preferable that the first sub-arrays are disposed to be adjacent to the second sub-arrays in the first direction and the second direction. In addition, it is preferable that the first first-direction same-color adjacent pixel, the second first-direction same-color adjacent pixel, the first first-direction different-color adjacent pixel, and the second first-direction different-color adjacent pixel are constituted of pixels, which have color filters with the first color and are adjacent to each other in the first direction, among pixels which have color filters with the first color in the first sub-arrays and the second sub-arrays which are adjacent in the first direction. In addition, it is preferable that the first second-direction same-color adjacent pixel, the second second-direction same-color adjacent pixel, the first second-direction different-color adjacent pixel, and the second second-direction different-color adjacent pixel are constituted of pixels, which have color filters with the first color and are adjacent to each other in the second direction, among pixels which have color filters with the first color in the first sub-arrays and the second sub-arrays which are adjacent in the second direction.

In the image capture device, it is preferable that the plurality of pixels includes pixel blocks each of which is formed in an array of 3×3 pixels in the first direction and the second direction, the pixel block being constituted of two pixels which have color filters with a second color and are disposed at two corners of four corners, two pixels which have color filters with a third color and are disposed at the other two corners of the four corners, and five pixels which have color filters with the first color and are arranged in a cross shape in the first direction and the second direction. In addition, it is preferable that the abnormal oblique-incident-light detection unit detects the abnormal oblique incident light, which is incident in the first or second direction onto the imaging element, on the basis of the pixel data of five pixels having color filters with the first color included in the pixel block.

In the image capture device, it is preferable that the correction unit corrects the pixel data of the pixels having the photodiodes, onto which the abnormal oblique incident light is incident, by using the pixel data of pixels, which have color filters with the first color, and pixels, which are adjacent thereto in the first direction and have color filters with the first color, when the abnormal oblique-incident-light detection unit detects the abnormal oblique incident light which is incident onto the imaging element in the first direction. In addition, it is preferable that the correction unit corrects the pixel data of the pixels having the photodiodes, onto which the abnormal oblique incident light is incident, by using the pixel data of the pixels, which have color filters with the first color, and the pixels, which are adjacent thereto in the second direction and have color filters with the first color, when the abnormal oblique-incident-light detection unit detects the abnormal oblique incident light which is incident onto the imaging element in the second direction.

In the image capture device, it is preferable that the plurality of pixels includes a plurality of basic array pixel groups each of which is constituted of pixels that are formed in an array of 4×4 pixels in the first direction and the second direction, the plurality of basic array pixel groups being arranged in parallel in the first direction and the second direction. In addition, it is preferable that each of the basic array pixel groups includes two first sub-arrays and two second sub-arrays each of which is constituted of pixels formed in an array of 2×2 pixels in the first direction and the second direction. In addition, it is preferable that each first sub-array is constituted of three pixels having color filters with the first color and a single pixel having a color filter with the second color, each second sub-array is constituted of three pixels having color filters with the first color and a single pixel having a color filter with the third color, and a position of the pixel having the color filter with the second color in the first sub-array corresponds to a position of the pixel having the color filter with the third color in the second sub-array. In addition, it is preferable that the first sub-arrays are disposed to be adjacent to the second sub-arrays in the first direction and the second direction. In addition, it is preferable that the pixel block is constituted of two pixels having color filters with the second color, two pixels having color filters with the third color, and five pixels having color filters with the first color, in each of the basic array pixel groups.

In the image capture device, it is preferable that the plurality of pixels includes pixels with the first color, which is formed by color filters with at least one or more colors, and pixels with the second color which is formed by color filters with at least two or more colors other than the first color. In addition, it is preferable that the pixels with the first color have the color filters with colors of which ratios of contribution to obtain luminance signals are higher than the ratios of the colors of the color filters of the pixels with the second color, and the pixels, which have color filters with the first color, are constituted of the pixels with the first color.

In the image capture device, it is preferable that each pixel with the first color has a green, transparent, or white color filter.

In order to achieve the object, according to another aspect of the present invention, there is provided an image processing method including: detecting incidence of abnormal oblique incident light onto an imaging element having a plurality of pixels, which are arranged in a first direction and a second direction perpendicular to the first direction and each of which has a color filter and a photodiode receiving light transmitted through the color filter and outputting pixel data, on the basis of the pixel data; and correcting the pixel data of the pixels having the photodiodes, onto which the abnormal oblique incident light is incident, on the basis of a detection result of the detecting of the incidence of the abnormal oblique incident light, in which the plurality of pixels includes a first first-direction same-color adjacent pixel constituted of pixel which has the color filter with a first color and is adjacent to a pixel having the color filter with the first color in the first direction, a second first-direction same-color adjacent pixel constituted of a pixel which has the color filter with a first color and is adjacent to a pixel having the color filter with the first color in the first direction, a first first-direction different-color adjacent pixel constituted of a pixel which have the color filter with the first color and is adjacent to a pixel having the color filter with a different color from the first color in the first direction, and a second first-direction different-color adjacent pixel constituted of a pixel which has the color filter with the first color and is adjacent to a pixel having the color filter with the different color from the first color in the first direction, and in which in the detecting of the incidence of the abnormal oblique incident light, abnormal oblique incident light, which is incident onto the imaging element in the first direction, is detected, on the basis of the pixel data of the first first-direction same-color adjacent pixel, the second first-direction same-color adjacent pixel, the first first-direction different-color adjacent pixel, and the second first-direction different-color adjacent pixel.

Thereby, it is possible to detect incidence of the abnormal oblique incident light on the basis of the pixel data, and it is possible to determine the incidence direction of the abnormal oblique incident light.

In order to achieve the object, according to a further aspect of the present invention, there is provided a non-transitory computer readable medium storing a program for causing a computer to execute: detecting incidence of abnormal oblique incident light onto an imaging element having a plurality of pixels, which are arranged in a first direction and a second direction perpendicular to the first direction and each of which has a color filter and a photodiode receiving light transmitted through the color filter and outputting pixel data, on the basis of the pixel data; and correcting the pixel data of the pixels having the photodiodes, onto which the abnormal oblique incident light is incident, on the basis of a detection result of the detecting of the incidence of the abnormal oblique incident light, in which the plurality of pixels includes a first first-direction same-color adjacent pixel constituted of a pixel which has the color filter with a first color and is adjacent to a pixel having the color filter with the first color in the first direction, a second first-direction same-color adjacent pixel constituted of a pixel which has the color filter with a first color and is adjacent to a pixel having the color filter with the first color in the first direction, a first first-direction different-color adjacent pixel constituted of a pixel which has the color filter with the first color and is adjacent to a pixel having the color filter with a different color from the first color in the first direction, and a second first-direction different-color adjacent pixel constituted of a pixel which has the color filter with the first color and is adjacent to a pixel having the color filter with the different color from the first color in the first direction, and in which in the detecting of the incidence of the abnormal oblique incident light, abnormal oblique incident light, which is incident onto the imaging element in the first direction, is detected, on the basis of the pixel data of the first first-direction same-color adjacent pixel, the second first-direction same-color adjacent pixel, the first first-direction different-color adjacent pixel, and the second first-direction different-color adjacent pixel.

Thereby, it is possible to detect incidence of the abnormal oblique incident light on the basis of the pixel data, and it is possible to determine the incidence direction of the abnormal oblique incident light.

According to the aspects of the present invention, it is possible to detect the abnormal oblique incident light and determine the incidence direction, and thus it is possible to further reduce the effect of color mixture caused by the abnormal oblique incident light.

BRIEF DESCRIPTION OF THE DRAWINGS

FIGS. 4A and 4B are diagrams illustrating generation of an image with noise caused by the variation in the pixel data.

FIG. 5 is a function block diagram of an image capture device according to an embodiment of the present invention.

DESCRIPTION OF THE PREFERRED EMBODIMENTS

Hereinafter, referring to accompanying drawings, an image capture device, an image processing method, and a non-transitory computer readable medium storing a program according to embodiments of the present invention will be described in detail. In addition, in the following description, a first direction is exemplified as the horizontal direction, and a second direction is exemplified as the vertical direction.

First, description will be given of occurrence of color mixture caused by abnormal oblique incident light and occurrence of variation (error) in the pixel data of pixels having color filters with the same color caused by occurrence of color mixture.

Figure 1:
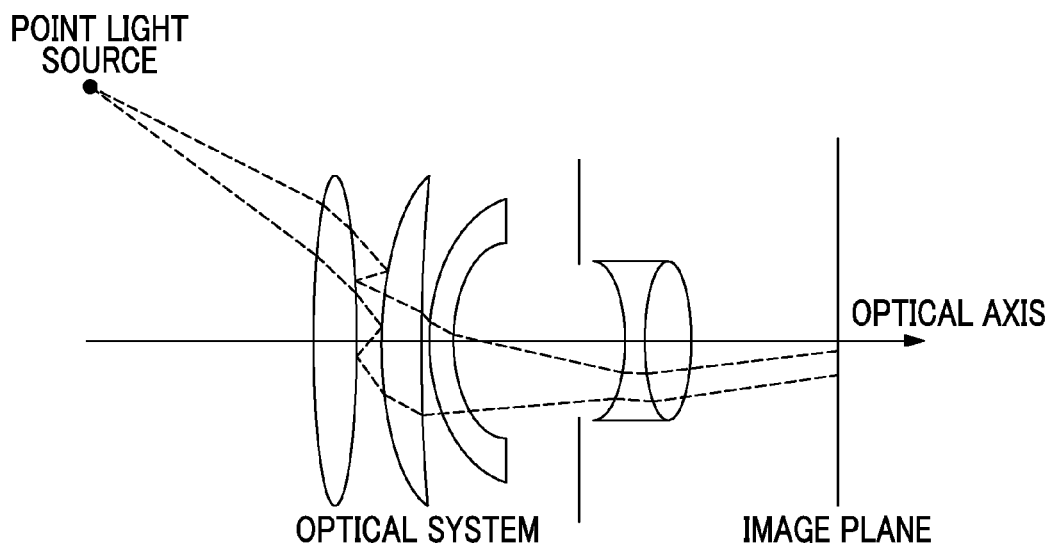
FIG. 1 is a diagram illustrating occurrence of abnormal oblique incident light.

In FIG. 1, in an optical system including a plurality of lenses, abnormal oblique incident light, which is generated by light originating from a certain point light source, is indicated by a dotted line. When the abnormal oblique incident light is generated, the light generated from the point light source reaches an image plane in a state where the light spreads without imaging, thereby forming ghosts. At this time, the abnormal oblique incident light may be incident at an angle onto the image plane.

In general, the ghost image is an optical image formed by light (unwanted light) such that a certain shape is visually recognized. The light reaches the image plane through an optical path different from an optical path along which original imaging light (effective imaging light) passes through reflection on an imaging element surface or a lens surface in the optical system including the plurality of lenses as shown in FIG. 1. Further, flare causes deterioration in contrast of an image or appears as blurred light in an image. The reason for this is that, when intense light is incident into the optical system, the light reaches, as unwanted light, the image plane through reflection on an imaging element surface or a lens surface in a similar manner, and a certain shape of the light is not visually recognized. Consequently, it can be said that occurrence of the abnormal oblique incident light causes flares or ghosts.

Figure 2A:
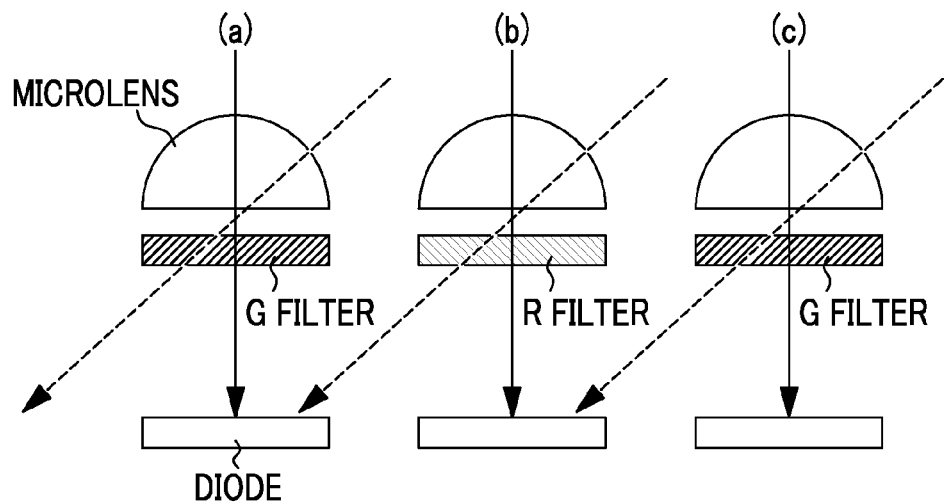
FIGS. 2A and 2B are diagrams illustrating occurrence of color mixture caused by the abnormal oblique incident light.
Figure 2B:
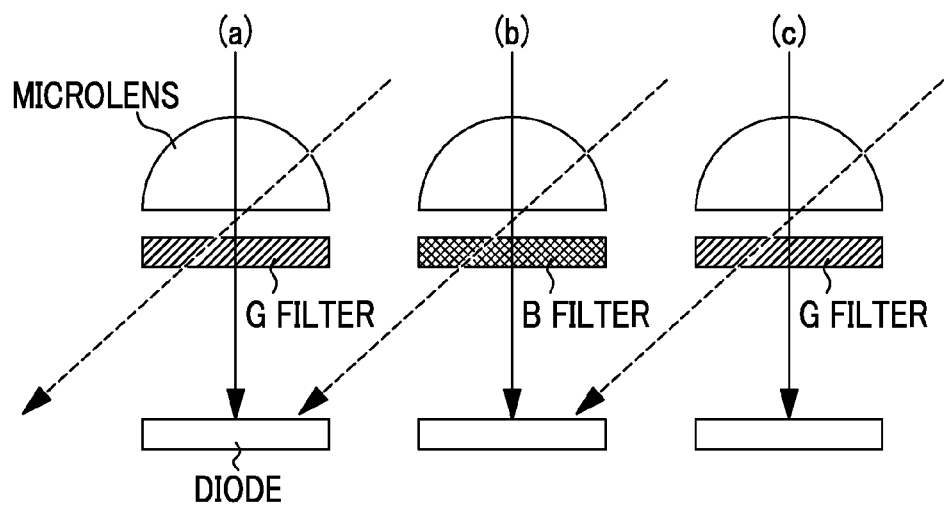

FIGS. 2A and 2B are diagrams illustrating occurrence of color mixture caused by the abnormal oblique incident light. Each dotted line in FIGS. 2A and 2B indicates the abnormal oblique incident light, and each solid line indicates incident light corresponding to an original image. In FIG. 2A, (a) is a pixel having a green (first color) filter (G filter), (b) is a pixel having a red (second color) filter (R filter), and (c) is the pixel having a G filter. Further, the pixel having the G filter shown in (a), the pixel having the R filter shown in (b), and the pixel having the G filter shown in (c) are arranged along the horizontal direction or the vertical direction. In (b), the abnormal oblique incident light passing through the R filter is incident onto a photodiode having the G filter shown in (a). Pixel data, which is output by the photodiode of (a) in which the abnormal oblique incident light passing through the R filter is received, is different from pixel data of pixels, in which the abnormal oblique incident light is not received, by an amount of the received abnormal oblique incident light.

In the embodiment of the present invention, color mixture caused by the abnormal oblique incident light has an effect on a difference between the pixel data of the pixels, in which the abnormal oblique incident light is received, and the pixel data of the pixels, in which the abnormal oblique incident light is not received, among pixels having color filters with the same color. Further, in (c), the abnormal oblique incident light passing through the G filter is incident onto a photodiode having the R filter shown in (b). Pixel data of the photodiode of (b), in which the abnormal oblique incident light passing through the R filter is received, is different from the pixel data of the pixels, in which the abnormal oblique incident light is not received, by an amount of the received abnormal oblique incident light passing through the G filter. Here, each piece of the pixel data of the pixels having the G filters, in which the abnormal oblique incident light passing through the R filter is received, is referenced by Rg.

In FIG. 2B, in a manner similar to that of FIG. 2A, in (b), abnormal oblique incident light passing through a blue (third color) filter (B filter) is incident onto a photodiode having the G filter shown in (a). Pixel data of the photodiode of (a), in which the abnormal oblique incident light passing through the B filter is received, is different from pixel data of pixels, in which the abnormal oblique incident light is not received, by an amount of the received abnormal oblique incident light.

In addition, in FIGS. 2A and 2B, the pixels are arranged to be adjacent in the horizontal direction or the vertical direction. Here, the pixels being arranged to be adjacent (adjacent pixels) mean that the pixels are adjacent in any of the four directions at the minimum pixel interval. The effect of color mixture caused by pixels positioned in the four directions at the minimum pixel intervals is dominant. Therefore, the description of the embodiments of the present invention will be given in consideration of mainly the color mixture caused by the adjacent pixels. However, this is not intended to exclude color mixture caused by pixels other than the adjacent pixels, and the color mixture caused by the pixels other than the adjacent pixels may be considered. Here, the pixels other than the adjacent pixels mean, for example, pixels arranged at positions separated, by √2 times the distances of the adjacent pixels, from the pixels of which colors are mixed.

Figure 3A:
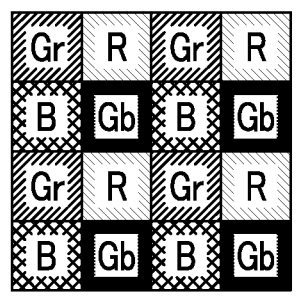
FIGS. 3A and 3B are diagrams illustrating occurrence of variation in the pixel data caused by color mixture.

FIG. 3A is a diagram illustrating a case where color mixture is caused by the abnormal oblique incident light in the pixel data which is output from an imaging element 22 when an image of a uniform photographic subject is captured by the imaging element 22 in which the color filters are formed in a Bayer array. In addition, in the case shown in FIG. 3A, the abnormal oblique incident light is incident from the left side or the right side of FIGS. 3A and 3B. In FIG. 3A, pixel data Gr corresponds to the pixel data of the pixels of (a) of FIG. 2A in the description of FIGS. 2A and 2B. Further, in FIG. 3A, pixel data Gb corresponds to the pixel data of the pixels of (a) of FIG. 2B in the description of FIGS. 2A and 2B.

Figure 6:
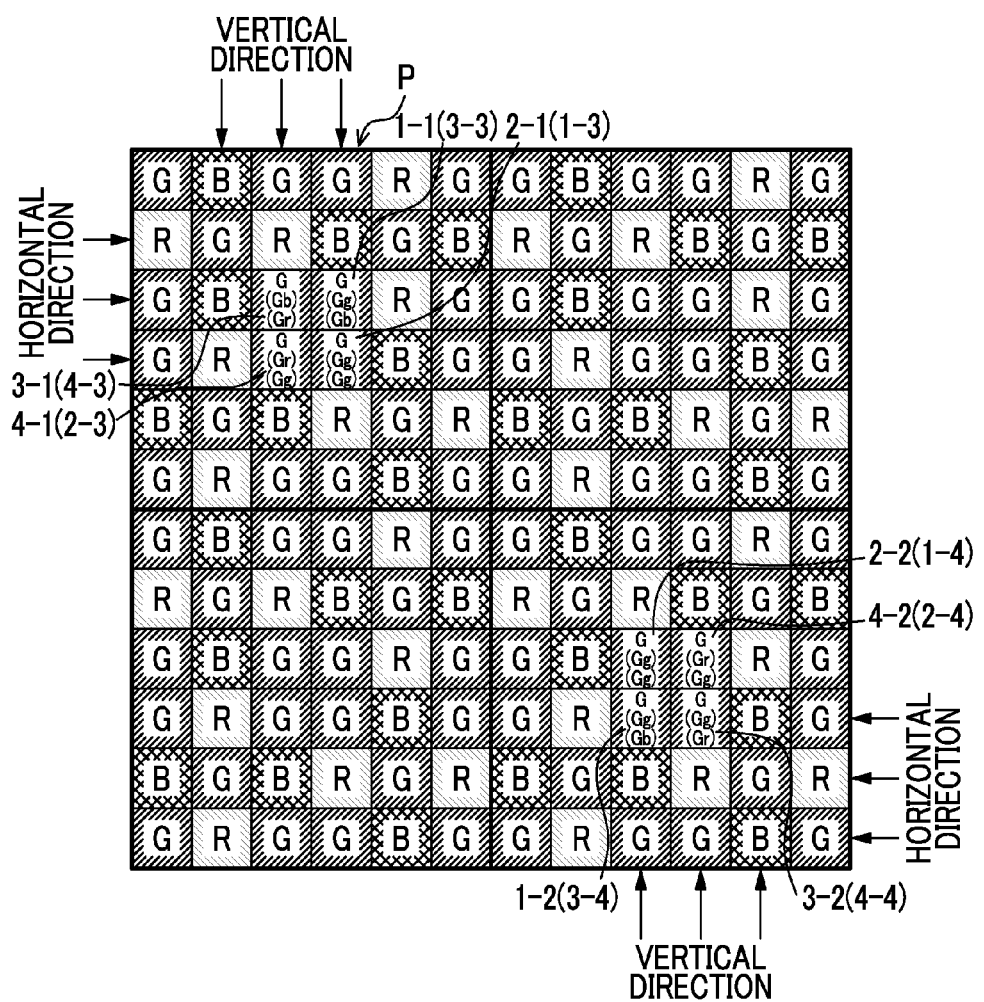
FIG. 6 is a diagram illustrating a color filter array provided in an imaging element.

Further, pixel data Gg is pixel data which is output when the abnormal oblique incident light passing through the G filter is received in the photodiode having an adjacent G filter (refer to FIG. 6).

Figure 3B:
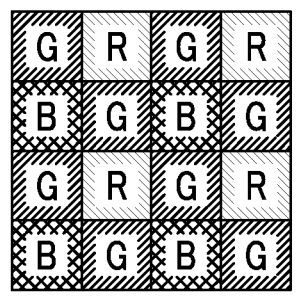

FIG. 3B shows pixel data in a case where color mixture is not caused since there is no incidence of abnormal oblique incident light in the pixel data which is output from the imaging element 22 when an image of a uniform photographic subject is captured by the imaging element 22 in which the color filters are formed in the Bayer array. As shown in FIG. 3B, in the case where color mixture is not caused since there is no incidence of abnormal oblique incident light, each piece of the pixel data of the pixels having the G filters is referenced by and indicates values which are substantially the same between the pixels having the G filters. However, as shown in FIG. 3A, if color mixture is caused by abnormal oblique incident light, each piece of the pixel data of the pixels having the G filters is referenced by Gr or Gb, and indicates variation (error).

FIG. 4 shows occurrence of image noise when demosaic processing (also called interpolation processing or synchronization processing) is performed on the pixel data which is output from the imaging element 22 in which the color filters are formed in the Bayer array as shown in FIG. 3A. When the demosaic processing is performed on the pixel data which is output from the imaging element 22 in which the color filters are formed in the Bayer array as shown in FIG. 3A, there is no vertical line or horizontal line on the original image (the image corresponding to FIG. 3B). However, it may be erroneously determined that there is a vertical line or a horizontal line since variation is caused in the pixel data by color mixture. In this case, there is concern that image noise having a lattice pattern is likely to occur on an image.

As shown in FIG. 4A, when the demosaic processing is performed on the pixel data, which is output from the imaging element 22 in which the color filters are formed in the Bayer array as shown in FIG. 3A, through determination that there is a correlation in the vertical direction due to variation between Gr and Gb, stripes of Gr and Gb can be formed. In contrast, as shown in FIG. 4B, when the demosaic processing is performed on the pixel data, which is output from the imaging element 22 in which the color filters are formed in the Bayer array, in the horizontal direction due to variation between Gr and Gb, stripes of Gr and Gb can be formed. Further, in the image data shown in FIG. 3A, it is difficult to determine whether there is a correlation in the vertical direction or there is a correlation in the horizontal direction, that is, to determine a correlation direction. Thus, there is a concern that image quality may be further deteriorated through the demosaic processing.

[Embodiment of Image Capture Device]

FIG. 5 is a block diagram of an image capture device 10 according to an embodiment of the present invention.

The image capture device 10 is a digital camera in which a captured image is recorded in an internal memory (memory section 26) or an external recording medium (not shown in the drawing), and operations of the entire device are integrally controlled by central processing unit (CPU) 12.

The image capture device 10 is provided with an operation section 14 including a shutter button (shutter switch), a mode dial, a reproduction button, a MENU/OK key, an arrow key, a zoom button, a BACK key, and the like. A signal from the operation section 14 is input to the CPU 12, and the CPU 12 controls respective circuits of the image capture device 10 on the basis of the input signal, thereby controlling, for example, a lens section 18, a shutter 20, and the imaging element 22 and performing photography operation control, image processing control, recording/reproduction control of image data, display control of a display section 25, and the like, through a device control section 16.

The lens section 18 includes a focus lens, a zoom lens, an aperture stop, and the like, where rays passing through the lens section 18 and the shutter 20 are imaged on a light receiving surface of the imaging element 22.

The imaging element 22 is a complementary metal-oxide semiconductor (CMOS) type, XY address type, or charge coupled device (CCD) type color image sensor, and multiple light receiving elements (photodiodes) are 2-dimensionally arranged. A photographic subject image, which is formed on the light receiving surface of each light receiving element, is converted into a signal voltage (or electric charge) corresponding to an amount of incident light.

<Embodiment of Imaging Element>

FIG. 6 is a diagram illustrating the imaging element 22 according to an embodiment, and particularly shows a color filter array which is disposed on the light receiving surface of the imaging element 22. Further, the imaging element 22 has a plurality of pixels which are arranged in the horizontal direction and the vertical direction, and each of the plurality of pixels has a color filter and a photodiode which receives light transmitted through the color filter and outputs pixel data. In addition, the photodiode unit a photoelectric conversion element that detects light and generates electric charge.

In the example of the imaging element 22 shown in FIG. 6, the imaging element 22 includes pixels 1-1, 2-1, 3-1, and 4-1. The pixel 1-1 is a pixel having a G filter (first first-direction same-color adjacent pixel) which is disposed to be adjacent to the right side of a pixel having a G filter in the horizontal direction on the page. The pixel 2-1 is a pixel having a G filter (second first-direction same-color adjacent pixel) which is disposed to be adjacent to the right side of a pixel having a G filter in the horizontal direction on the page. The pixel 3-1 is a pixel having a G filter (first first-direction different-color adjacent pixel) which is disposed to be adjacent to the right side of a pixel having a B filter in the horizontal direction on the page. The pixel 4-1 is a pixel having a G filter (second first-direction different-color adjacent pixel) which is disposed to be adjacent to the right side of a pixel having an R filter in the horizontal direction on the page.

Further, in the example of the imaging element 22 shown in FIG. 6, the imaging element 22 includes pixels 1-2, 2-2, 3-2, and 4-2. The pixel 1-2 is a pixel having a G filter (first first-direction same-color adjacent pixel) which is disposed to be adjacent to the left side of a pixel having a G filter in the horizontal direction on the page. The pixel 2-2 is a pixel having a G filter (second first-direction same-color adjacent pixel) which is disposed to be adjacent to the left side of a pixel having a G filter in the horizontal direction on the page. The pixel 3-2 is a pixel having a G filter (first first-direction different-color adjacent pixel) which is disposed to be adjacent to the left side of a pixel having a B filter in the horizontal direction on the page. The pixel 4-2 is a pixel having a G filter (second first-direction different-color adjacent pixel) which is disposed to be adjacent to the left side of a pixel having an R filter in the horizontal direction on the page.

Further, in the example of the imaging element 22 shown in FIG. 6, the imaging element 22 includes pixels 1-3, 2-3, 3-3, and 4-3. The pixel 1-3 is a pixel having a G filter (first second-direction same-color adjacent pixel) which is disposed to be adjacent to the lower side of a pixel having a G filter in the vertical direction on the page. The pixel 2-3 is a pixel having a G filter (second second-direction same-color adjacent pixel) which is disposed to be adjacent to the lower side of a pixel having a G filter in the vertical direction on the page. The pixel 3-3 is a pixel having a G filter (first second-direction different-color adjacent pixel) which is disposed to be adjacent to the lower side of a pixel having a B filter in the vertical direction on the page. The pixel 4-3 is a pixel having a G filter (second second-direction different-color adjacent pixel) which is disposed to be adjacent to the lower side of a pixel having an R filter in the vertical direction on the page.

Further, in the example of the imaging element 22 shown in FIG. 6, the imaging element 22 includes pixels 1-4, 2-4, 3-4, and 4-4. The pixel 1-4 is a pixel having a G filter (first second-direction same-color adjacent pixel) which is disposed to be adjacent to the upper side of a pixel having a G filter in the vertical direction on the page. The pixel 2-4 is a pixel having a G filter (second second-direction same-color adjacent pixel) which is disposed to be adjacent to the upper side of a pixel having a G filter in the vertical direction on the page. The pixel 3-4 is a pixel having a G filter (first second-direction different-color adjacent pixel) which is disposed to be adjacent to the upper side of a pixel having a B filter in the vertical direction on the page. The pixel 4-4 is a pixel having a G filter (second second-direction different-color adjacent pixel) which is disposed to be adjacent to the upper side of a pixel having an R filter in the vertical direction on the page.

Further, as shown in FIG. 6, the pixel having the G filter (first first-direction different-color adjacent pixel) (the reference numeral 3-1 of FIG. 6), which is disposed to be adjacent to the right side of the pixel having the B filter in the horizontal direction on the page, and the pixel having the G filter (second first-direction different-color adjacent pixel) (the reference numeral 4-1 of FIG. 6), which is disposed to be adjacent to the right side of the pixel having the R filter in the horizontal direction on the page, are respectively disposed to be adjacent to the right sides of pixels having color filters with colors different from each other in the horizontal direction on the page.

Further, as shown in FIG. 6, the pixel having the G filter (first first-direction different-color adjacent pixel) (the reference numeral 3-2 of FIG. 6), which is disposed to be adjacent to the left side of the pixel having the B filter in the horizontal direction on the page, and the pixel having the G filter (second first-direction different-color adjacent pixel) (the reference numeral 4-2 of FIG. 6), which is disposed to be adjacent to the left side of the pixel having the R filter in the horizontal direction on the page, are respectively disposed to be adjacent to the left sides of pixels having color filters with colors different from each other in the horizontal direction on the page.

Likewise, the pixel having the G filter (first second-direction different-color adjacent pixel) (the reference numeral 3-3 of FIG. 6), which is disposed to be adjacent to the lower side of the pixel having the B filter in the vertical direction on the page, and the pixel having the G filter (second second-direction different-color adjacent pixel) (the reference numeral 4-3 of FIG. 6), which is disposed to be adjacent to the lower side of the pixel having the R filter in the vertical direction on the page, are respectively disposed to be adjacent to the lower sides of pixels having color filters with colors different from each other in the vertical direction on the page.

Likewise, the pixel having the G filter (first second-direction different-color adjacent pixel) (the reference numeral 3-4 of FIG. 6), which is disposed to be adjacent to the upper side of the pixel having the B filter in the vertical direction on the page, and the pixel having the G filter (second second-direction different-color adjacent pixel) (the reference numeral 4-4 of FIG. 6), which is disposed to be adjacent to the upper side of the pixel having the R filter in the vertical direction on the page, are respectively disposed to be adjacent to the upper sides of pixels having color filters with colors different from each other in the vertical direction on the page.

More specifically, the color filter array of the imaging element 22 shown in FIG. 6 will be described. The color filter array of the imaging element 22 includes basic array pixel groups P (pixel groups indicated by the thick frame) each of which is formed in a square array pattern corresponding to 6×6 pixels, and the basic array pixel groups P are disposed to be repeated in the horizontal direction and the vertical direction. In other words, in the color filter array, the R, and B filters are arranged with a predetermined periodicity.

As described above, since the R, and B filters are arranged with a predetermined periodicity, when demosaic processing and the like are performed on R, and B signals which are read from the imaging element 22, the processing can be performed in accordance with the repeated pattern.

In the color filter array shown in FIG. 6, the filters with all colors of R, and B are disposed in lines in the horizontal direction and the vertical direction in the basic array pixel groups P. Thereby, if it is determined that the correlation direction is the horizontal direction or the vertical direction at the time of demosaic processing, it is possible to perform interpolation by using pixel data of the pixels with different colors present in the horizontal direction or the vertical direction. Hence, it is possible to prevent occurrence of color moire (false color). Since it is possible to prevent occurrence of false color as described above, an optical low-pass filter can be set not to be disposed in the optical path from the incident surface to the imaging surface of the optical system. Alternatively, since it is possible to prevent occurrence of false color even when an optical low-pass filter is applied, a low-pass filter, of which a function of cutting high frequency components is weak, can be applied. As a result, it is possible to prevent resolution from being lowered.

Figure 7:
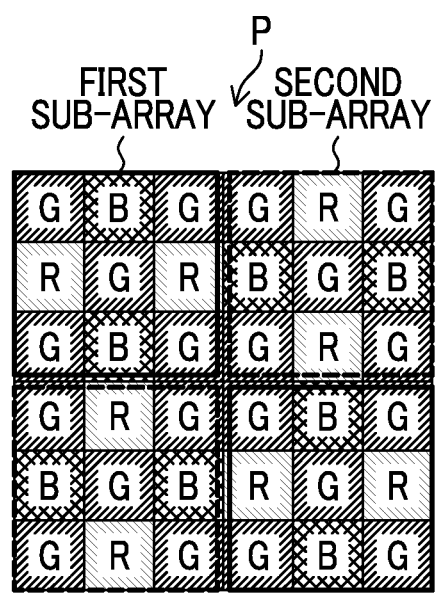
FIG. 7 is a diagram illustrating a situation in which a basic array pixel group of the color filter array shown in FIG. 6 is divided into first sub-arrays and second sub-arrays.

FIG. 7 shows a situation in which the basic array pixel group P shown in FIG. 6 is divided into four parts each of which is formed of 3×3 pixels.

As shown in FIG. 7, each basic array pixel group P includes two first sub-arrays and two second sub-arrays each of which is constituted of pixels formed in an array of 3×3 pixels in the horizontal direction and the vertical direction. Each first sub-array includes: a single pixel which has the G filter and is disposed at the center of the array; four pixels which have the G filters and are disposed at four corners; two pixels which have the R filters and are disposed in the horizontal direction with the single pixel, which has the G filter and is disposed at the center of the array, interposed therebetween; and two pixels which have the B filters and are disposed in the vertical direction with the single pixel, which has the G filter and is disposed at the center of the array, interposed therebetween.

Each second sub-array includes: a single pixel which has the G filter and is disposed at the center of the array; four pixels which have the G filters and are disposed at four corners; two pixels which have the B filters and are disposed in the horizontal direction with the single pixel, which has the G filter and is disposed at the center of the array, interposed therebetween; and two pixels which have the R filters and are disposed in the vertical direction with the single pixel, which has the G filter and is disposed at the center of the array, interposed therebetween.

The first sub-arrays are disposed to be adjacent to the second sub-arrays in the horizontal direction and the vertical direction, and each first-color pixel group (which is a group of the pixels which have the G filters and are formed in an array of 2×2 pixels, or is also referred to as a square array) is constituted of the two first sub-arrays and the two second sub-arrays.

The basic array pixel group P includes parts in which two or more G filters are adjacent in the horizontal, vertical, and oblique directions. The color filter array, in which the basic array pixel groups P are arranged in the horizontal direction and the vertical direction, includes square arrays each of which corresponds to 2×2 pixels having G filters (refer to FIG. 6).

The reason for this is that, as shown in FIG. 7, the G filter in the luminance pixel is disposed at the center and the four corners in the 3×3 pixels in the first sub-array or the second sub-array, and the 3×3 pixels are alternately arranged in the horizontal direction and the vertical direction so as to form G filters having a square array which corresponds to 2×2 pixels. Pixel data of the 2×2 pixels having the G filters can be used in calculation (direction determination) of correlation direction of the luminance in the horizontal direction, the vertical direction, and the oblique direction.

Further, the pixel groups of 2×2 pixels having the G filters (first-color pixel group) include the first first-direction same-color adjacent pixel, the second first-direction same-color adjacent pixel, the first first-direction different-color adjacent pixel, and the second first-direction different-color adjacent pixel, and include the first second-direction same-color adjacent pixel, the second second-direction same-color adjacent pixel, the first second-direction different-color adjacent pixel, and the second second-direction different-color adjacent pixel.

The signal electric charge accumulated in the imaging element 22 having the above-mentioned configuration is read as a voltage signal corresponding to the signal electric charge on the basis of the read signal applied from the device control section 16. The voltage signal, which is read from the imaging element 22, is applied to an A/D converter 24, and is herein sequentially converted into digital R, and B signals corresponding to the color filter array, and the signals are temporarily stored in the memory section 26.

The memory section 26 includes a SDRAM as a volatile memory, an EEPROM (storage unit) as a rewritable nonvolatile memory, and the like. The SDRAM is used as a work area when the CPU 12 executes a program, and used as a storage area for temporarily storing digital image signals which are acquired through image capturing. On the other hand, the EEPROM stores camera control programs including an image processing program, defect information of the pixels of the imaging element 22, various parameters and tables used in image processing including color mixture correction, and the like.

The image processing section 28 performs predetermined signal processing on digital image signals temporarily stored in the memory section 26. The processing includes color mixture correction, white balance correction, gamma correction processing, demosaic processing (synchronization processing), RGB/YC conversion, and the like. In addition, the image processing section 28 according to the embodiment of the present invention further includes an abnormal oblique-incident-light detection portion (abnormal oblique-incident-light detection unit) 34 and a correction portion (correction unit) 36. The abnormal oblique-incident-light detection portion 34 and the correction portion 36 will be described later.

Image data, which is processed by the image processing section 28, is encoded into data for image display in an encoder 30, and is output to the display section 25, which is provided on the rear side of the camera, through a driver 32. Thereby, a photographic subject image is continuously displayed on a display screen of the display section 25.

When the shutter button of the operation section 14 is pressed down to a first stage (pressed halfway), the CPU 12 starts an AF operation and an AE operation, and causes the device control section 16 to move a focus lens of the lens section 18 in a direction of an optical axis, thereby performing control of moving the focus lens into an in-focus position.

The CPU 12 calculates a luminance (photography Ev value) of the photographic subject on the basis of the image data which is output from the A/D converter 24 when the shutter button is pressed halfway, and determines exposure conditions (an F number and a shutter speed) on the basis of the photography Ev value.

When the AE operation and the AF operation end and the shutter button is pressed down to a second stage (pressed fully), image capturing is performed by controlling the aperture stop, the shutter 20, and a charge accumulation period of the imaging element 22 on the basis of the determined exposure conditions. Image data of a RGB mosaic image (an image corresponding to the color filter array shown in FIG. 6), which is read from the imaging element 22 at the time of image capturing and is A/D converted by the A/D converter 24, is temporarily stored in the memory section 26.

The image data, which is temporarily stored in the memory section 26, is appropriately read by the image processing section 28. Here, predetermined signal processing is performed on the image data. The processing includes the abnormal oblique-incident-light detection, the color mixture correction, the white balance correction, the gamma correction, the demosaic processing, the RGB/YC conversion, and the like. Image data (YC data), which is RGB/YC converted, is compressed in accordance with a predetermined compression format (for example, JPEG format), and the compressed image data is recorded as a predetermined image file (for example, Exif file) format in the internal memory or the external memory.

[Abnormal Oblique-Incident-Light Detection]

The image capture device 10 of the embodiment of the present invention has the abnormal oblique-incident-light detection portion (abnormal oblique-incident-light detection unit) 34, which detects abnormal oblique incident light, in the image processing section (image processing unit) 28. The abnormal oblique-incident-light detection portion 34 detects abnormal oblique incident light, which is incident onto the imaging element 22 in the horizontal direction, on the basis of the pixel data of the first first-direction same-color adjacent pixels, the second first-direction same-color adjacent pixels, the first first-direction different-color adjacent pixels, and the second first-direction different-color adjacent pixels.

In FIG. 6, description will be given of detection of abnormal oblique incident light which is incident from the left side in the horizontal direction on the page, where the detection is performed by the abnormal oblique-incident-light detection portion 34. When the abnormal oblique incident light is incident from the left side in the horizontal direction on the page onto the pixel (first first-direction same-color adjacent pixel) which is indicated by the reference numeral 1-1 of FIG. 6 and has the G filter, the pixel is affected by color mixture caused from the pixel (the reference numeral 3-1 of FIG. 6) which is adjacent to the left side of the former pixel in the horizontal direction on the page and has the G filter. Then, the pixel, which is indicated by the reference numeral 1-1 of FIG. 6 and has the G filter, outputs the pixel data Gg.

When the abnormal oblique incident light is incident from the left side in the horizontal direction on the page onto the pixel (second first-direction same-color adjacent pixel) which is indicated by the reference numeral 2-1 of FIG. 6 and has the G filter, the pixel is affected by color mixture caused from the pixel (the reference numeral 4-1 of FIG. 6) which is adjacent to the left side of the former pixel in the horizontal direction on the page and has the G filter. Then, the pixel, which is indicated by the reference numeral 2-1 of FIG. 6 and has the G filter, outputs the pixel data Gg.

When the abnormal oblique incident light is incident from the left side in the horizontal direction on the page onto the pixel which is indicated by the reference numeral 3-1 of FIG. 6 and has the G filter (first first-direction different-color adjacent pixel), the pixel is affected by color mixture caused from the pixel which is adjacent to the left side of the former pixel in the horizontal direction on the page and has the B filter. Then, the pixel, which is indicated by the reference numeral 3-1 of FIG. 6 and has the G filter, outputs the pixel data Gb.

When the abnormal oblique incident light is incident from the left side in the horizontal direction on the page onto the pixel which is indicated by the reference numeral 4-1 of FIG. 6 and has the G filter (second first-direction different-color adjacent pixel), the pixel is affected by color mixture caused from the pixel which is adjacent to the left side of the former pixel in the horizontal direction on the page and has the R filter. Then, the pixel, which is indicated by the reference numeral 4-1 of FIG. 6 and has the G filter, outputs the pixel data Gr.

Subsequently, the abnormal oblique-incident-light detection portion 34 compares pixel data of: the above-mentioned first first-direction same-color adjacent pixel (the reference numeral 1-1 of FIG. 6); the above-mentioned second first-direction same-color adjacent pixel (the reference numeral 2-1 of FIG. 6); the above-mentioned first first-direction different-color adjacent pixel (the reference numeral 3-1 of FIG. 6); and the above-mentioned second first-direction different-color adjacent pixel (the reference numeral 4-1 of FIG. 6).

As described above, the pixel data pieces of the first first-direction same-color adjacent pixel (the reference numeral 1-1 of FIG. 6) and the second first-direction same-color adjacent pixel (the reference numeral 2-1 of FIG. 6) are Gg and are the same. Further, the pixel data pieces of the first first-direction different-color adjacent pixel (the reference numeral 3-1 of FIG. 6) and the second first-direction different-color adjacent pixel (the reference numeral 4-1 of FIG. 6) are respectively Gb and Gr and are different. From this result, the abnormal oblique-incident-light detection portion 34 is able to determine that there is abnormal oblique incident light which is incident from the left side in the horizontal direction on the page.

In addition, the pixel data pieces Gg are the same, which means that a difference value between the pixel data (Gg) of the first first-direction same-color adjacent pixel and the pixel data (Gg) of the second first-direction same-color adjacent pixel is within 2% of the pixel data of the first first-direction same-color adjacent pixel (or the second first-direction same-color adjacent pixel), and may be within 1% in accordance with an image capturing target.

Further, the pixel data pieces Gb and Gr are different, which means that an absolute value of the difference value is equal to or greater than 10% of the pixel data of the first first-direction same-color adjacent pixel (or the second first-direction same-color adjacent pixel), and may be equal to or greater than 8% in accordance with an image capturing target.

Next, in FIG. 6, description will be given of detection of abnormal oblique incident light which is incident from the upper side in the vertical direction on the page, where the detection is performed by the abnormal oblique-incident-light detection portion 34. When the abnormal oblique incident light is incident from the upper side in the vertical direction on the page onto the pixel (first second-direction same-color adjacent pixel) which is indicated by the reference numeral 1-3 of FIG. 6 and has the G filter, the pixel (the reference numeral 3-3 of FIG. 6) is affected by color mixture caused from the adjacent pixel which has the G filter. Then, the pixel, which is indicated by the reference numeral 1-3 of FIG. 6 and has the G filter, outputs the pixel data Gg.

When the abnormal oblique incident light is incident from the upper side in the vertical direction on the page onto the pixel (second second-direction same-color adjacent pixel) which is indicated by the reference numeral 2-3 of FIG. 6 and has the G filter, the pixel is affected by color mixture caused from the adjacent pixel (the reference numeral 4-3 of FIG. 6)

which has the G filter. Then, the pixel, which is indicated by the reference numeral 2-3 of FIG. 6 and has the G filter, outputs the pixel data Gg.

When the abnormal oblique incident light is incident from the upper side in the vertical direction on the page onto the pixel which is indicated by the reference numeral 3-3 of FIG. 6 and has the G filter (first second-direction different-color adjacent pixel), the pixel is affected by color mixture caused from the pixel above which has the B filter. Then, the pixel, which is indicated by the reference numeral 3-3 of FIG. 6 and has the G filter, outputs the pixel data Gb.

When the abnormal oblique incident light is incident from the upper side in the vertical direction on the page onto the pixel which is indicated by the reference numeral 4-3 of FIG. 6 and has the G filter (second second-direction different-color adjacent pixel), the pixel is affected by color mixture caused from the pixel above which has the R filter. Then, the pixel, which is indicated by the reference numeral 4-3 of FIG. 6 and has the G filter, outputs the pixel data Gr.

Subsequently, the abnormal oblique-incident-light detection portion 34 compares pixel data of: the above-mentioned first second-direction same-color adjacent pixel (the reference numeral 1-3 of FIG. 6); the above-mentioned second second-direction same-color adjacent pixel (the reference numeral 2-3 of FIG. 6); the above-mentioned first second-direction different-color adjacent pixel (the reference numeral 3-3 of FIG. 6); and the above-mentioned second second-direction different-color adjacent pixel (the reference numeral 4-3 of FIG. 6). As described above, the pixel data pieces of the first second-direction same-color adjacent pixel (the reference numeral 1-3 of FIG. 6) and the second second-direction same-color adjacent pixel (the reference numeral 2-3 of FIG. 6) are Gg and are the same. Further, the pixel data pieces of the first second-direction different-color adjacent pixel (the reference numeral 3-3 of FIG. 6) and the second second-direction different-color adjacent pixel (the reference numeral 4-3 of FIG. 6) are respectively Gb and Gr and are different. From this result, the abnormal oblique-incident-light detection portion 34 determines that there is abnormal oblique incident light which is incident from the upper side in the vertical direction on the page.

In addition, the pixel data pieces Gg are the same, which means that a difference value between the pixel data (Gg) of the first second-direction same-color adjacent pixel and the pixel data (Gg) of the second second-direction same-color adjacent pixel is within 2% of the pixel data of the first second-direction same-color adjacent pixel (or the second second-direction same-color adjacent pixel), and may be within 1% in accordance with an image capturing target.

Further, the pixel data pieces Gb and Gr are different, which means that an absolute value of the difference value is equal to or greater than 10% of the pixel data of the first second-direction same-color adjacent pixel (or the second second-direction same-color adjacent pixel), and may be equal to or greater than 8% in accordance with an image capturing target.

In addition, the following cases are the same as described above: a case of detection of abnormal oblique incident light which is incident from the right side in the horizontal direction on the page, where the detection is performed by the abnormal oblique-incident-light detection portion 34; and a case of detection of abnormal oblique incident light which is incident from the lower side in the vertical direction on the page, where the detection is performed by the abnormal oblique-incident-light detection portion 34.

As described above, the abnormal oblique-incident-light detection portion 34 detects the abnormal oblique incident light which is incident from the four directions (the abnormal oblique incident light incident from the left side in the horizontal direction on the page, the abnormal oblique incident light incident from the right side in the horizontal direction on the page, the abnormal oblique incident light incident from the upper side in the vertical direction on the page, and the abnormal oblique incident light incident from the lower side in the vertical direction on the page). In other words, the abnormal oblique-incident-light detection portion 34 also determines the incidence direction of the abnormal oblique incident light when detecting the abnormal oblique incident light.

Here, it is assumed that a positive direction of the first direction is a left direction of the horizontal direction on the page and a negative direction of the first direction is a right direction of the horizontal direction on the page. Further, it is assumed that a positive direction of the second direction is a down direction of the vertical direction on the page and a negative direction of the second direction is an up direction of the vertical direction on the page.

As described above, the detection of the abnormal oblique incident light is performed when variation in the pixel data occurs in a certain range. The certain range described above is defined as a range in which it is possible to detect general ghosts (images which are generated by the abnormal oblique incident light and should not originally have existed). For example, the abnormal oblique incident light may be detected in a range of 64×64 pixels, and the abnormal oblique incident light may be detected in 32×32 pixels.

[Color Mixture Correction]

The correction portion 36 corrects color mixture caused by incidence of abnormal oblique incident light. That is, when the abnormal oblique-incident-light detection portion 34 detects the abnormal oblique incident light which is incident onto the imaging element 22 in the horizontal direction, the correction portion 36 is able to correct the pixel data Gb and the pixel data Gr by using the pixel data Gg.

The pixel data Gb and the pixel data Gr are corrected by using the pixel data Gg, whereby it is possible to minimize the effect of color mixture. That is, when the pixel data Gg, the pixel data Gr, and the pixel data Gb are compared, color mixture in the pixel data Gg includes leakage from the same-color pixels, and the pixel data Gg is least affected by color mixture. Hence, by using the pixel data Gg, the pixel data Gr and the pixel data Gb are corrected.

The correction portion 36 performs correction on the pixel data pieces Gr and Gb by using the pixel data Gg through various methods. For example, the correction portion 36 may perform the correction by replacing the pixel data Gg with the pixel data of the pixel having the pixel data pieces Gr and Gb. Further, the pixel data of the pixel having the G filter may be corrected by using an average value of the pixel data Gr and the pixel data Gg, an average value of the pixel data Gb and the pixel data Gg, or an average value of the pixel data Gb, the pixel data Gr, and the pixel data Gg.

The correction portion 36 may perform color mixture correction in consideration of the incidence direction of the abnormal oblique incident light as described in FIGS. 8A to 8E and 9A to 9E.

Figure 8A:
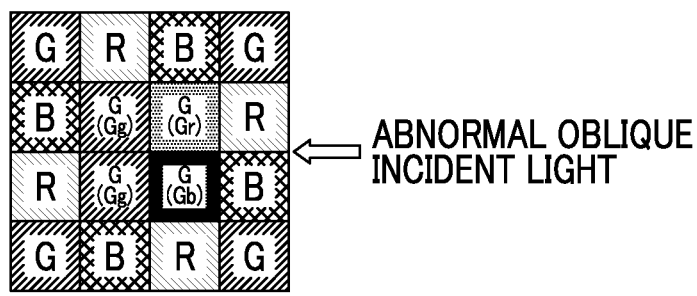
FIGS. 8A to 8E are diagrams illustrating use of an incidence direction of the abnormal oblique incident light in color mixture correction.
Figure 8B:
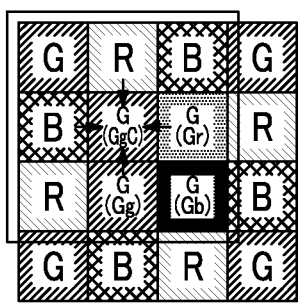
Figure 8C:
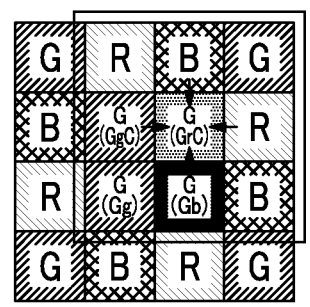
Figure 8D:
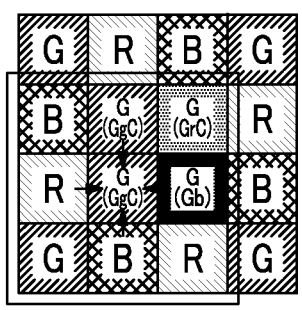
Figure 8E:
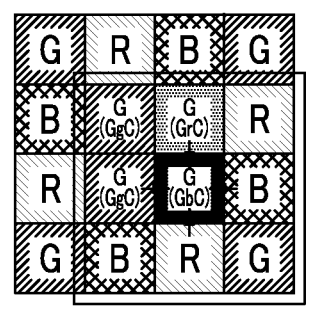
Figure 9A:
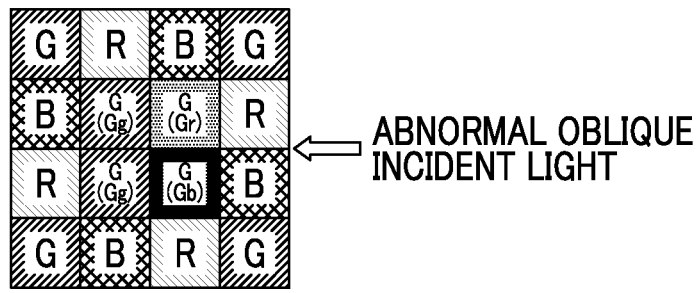
FIGS. 9A to 9E are diagrams illustrating use of the incidence direction of the abnormal oblique incident light in color mixture correction.

Each of FIGS. 8A and 9A shows a part of the imaging element 22 shown in FIG. 6, and shows a case where abnormal oblique incident light is incident from the right side in the horizontal direction on the page in FIGS. 8A to 8E and 9A to 9E. In the imaging element 22 shown in FIG. 6, when abnormal oblique incident light is incident from the right side in the horizontal direction on the page as shown in FIGS. 8A and 9A, a pixel group (first-color pixel group) of 2×2 pixels having G filters outputs the pixel data pieces Gg, Gg, Gr, and Gb.

As shown in FIGS. 8B to 8E, when correction is performed on pixel data of a pixel having a G filter on the basis of pixel data pieces of the adjacent pixels in the four directions, the pixel data pieces Gr and Gb of the pixels affected by color mixture are used in correction, and thus values of corrected pixel data pieces GgC may be different from each other.

Hereinafter, the difference between the values of the corrected pixel data pieces GgC will be described. First, as shown in FIG. 8B, color mixture correction is performed on the pixel data indicating Gg positioned on the upper left side of the first-color pixel group on the page, by using values of the pixel data pieces of the adjacent pixels in the four directions (right, left, up, and down directions on the page), and thereby the pixel data GgC is obtained. The pixel data GgC is affected by color mixture since the pixel data indicating Gr affected by color mixture is used in the color mixture correction.

Next, as shown in FIG. 8C, color mixture correction is performed on the pixel data indicating Gr on the upper right side of the first-color pixel group on the page by using the values of the pixel data pieces of the adjacent pixels in the four directions, and thereby pixel data GrC is obtained. Next, as shown in FIG. 8D, color mixture correction is performed on the pixel data indicating Gg on the lower left side of the first-color pixel group on the page by using the values of the pixel data pieces of the surrounding pixels, and thereby the pixel data GgC is obtained. The pixel data GgC is affected by color mixture since the pixel data indicating Gb affected by color mixture is used in the color mixture correction.

Next, as shown in FIG. 8E, color mixture correction is performed on the pixel data indicating Gb on the lower right side of the first-color pixel group on the page by using the values of the pixel data pieces of the surrounding pixels, and thereby the pixel data GbC is obtained.

In FIGS. 8B and 8D, by performing color mixture correction on the same pixel data pieces Gg, it is possible to obtain the pixel data pieces GgC. However, each piece of the pixel data GgC of FIGS. 8B and 8D is affected by different color mixture. Therefore, each piece of the pixel data GgC of FIGS. 8B and 8D indicates a different value. That is, color mixture has an effect on the pixel data Gr in the case of FIG. 8B, and color mixture has an effect on the pixel data Gb in the case of FIG. 8D, and thus the mixed colors are different between Gr and Gb. Hence, there is a difference in the effect of the color mixture between pixel data pieces GgC obtained from the results of the color mixture correction.

In contrast, in the color mixture correction shown in FIG. 9, the color mixture correction is performed in consideration of the incidence direction of the abnormal oblique incident light. Hence, there is no difference between pixel data pieces GgC obtained after the color mixture correction. Hereinafter, the difference between the values of the corrected pixel data pieces GgC will be described.

Figure 9B:
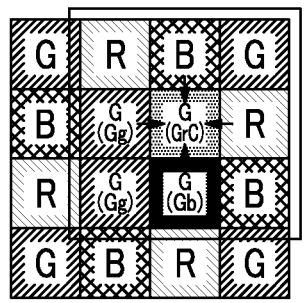

First, as shown in FIG. 9B, color mixture correction is performed on the pixel data indicating Gr on the upper right side of the first-color pixel group on the page by using the values of the pixel data pieces of the adjacent pixels in the four directions, and thereby the pixel data GrC is obtained. Here, strong color mixture correction in the incidence direction (right side) of the abnormal oblique incident light may be performed.

Figure 9C:
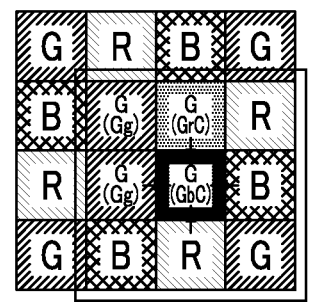
Figure 9D:
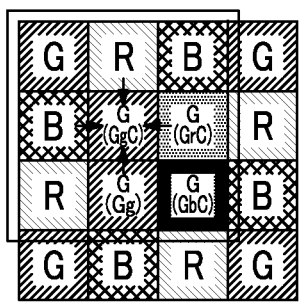

Next, as shown in FIG. 9C, color mixture correction is performed on the pixel data indicating Gb on the lower right side of the first-color pixel group on the page by using the values of the pixel data pieces of the adjacent pixels in the four directions, and thereby the pixel data GbC is obtained. Next, as shown in FIG. 9D, color mixture correction is performed on the pixel data indicating Gg on the upper left side of the first-color pixel group on the page by using the values of the pixel data pieces of the adjacent pixels in the four directions, and thereby the pixel data GgC is obtained. At this time, the pixel data indicating GrC is used in the color mixture correction, but color mixture correction is performed on GrC in advance. Therefore, the effect of the color mixture correction is eliminated.

Figure 9E:
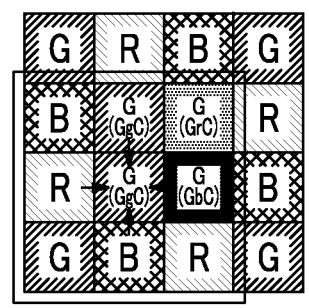

Next, as shown in FIG. 9E, color mixture correction is performed on the pixel data indicating Gb on the lower left side of the first-color pixel group on the page by using the values of the pixel data pieces of the surrounding pixels, and thereby the pixel data GgC is obtained. At this time, the pixel data indicating GbC is used in the color mixture correction, but color mixture correction is performed on GbC in advance. Therefore, the effect of the color mixture correction is eliminated.

In FIGS. 9D and 9E, the pixel data pieces GgC, which are obtained by performing color mixture correction on the same pixel data pieces Gg, also indicate the same values. The reason for this is as follows. Color mixture has an effect on the pixel data Gr in the case of FIG. 9B, and color mixture has an effect on the pixel data Gb in the case of FIG. 9C, but color mixture correction is performed in FIGS. 9B and 9C before color mixture correction is performed in FIGS. 9D and 9E, thereby eliminating the effect of the color mixture.

As described above, in consideration of the incidence direction of the abnormal oblique incident light, by changing an order of pixels to be photographic subjected to color mixture correction, it is possible to perform color mixture correction more accurately. In the case of FIGS. 9A to 9E, by performing color mixture correction in order from the positions of the pixels in the incidence direction of the abnormal oblique incident light, it is possible to perform color mixture correction more accurately.

In the embodiment of the present invention, it is possible to use the imaging elements 22 having various color filter arrays. In the following description, as a modification example, an imaging element 22 having a different color filter array will be described.

<Another Embodiment (Modification Example 1) of Imaging Element>

Figure 10:
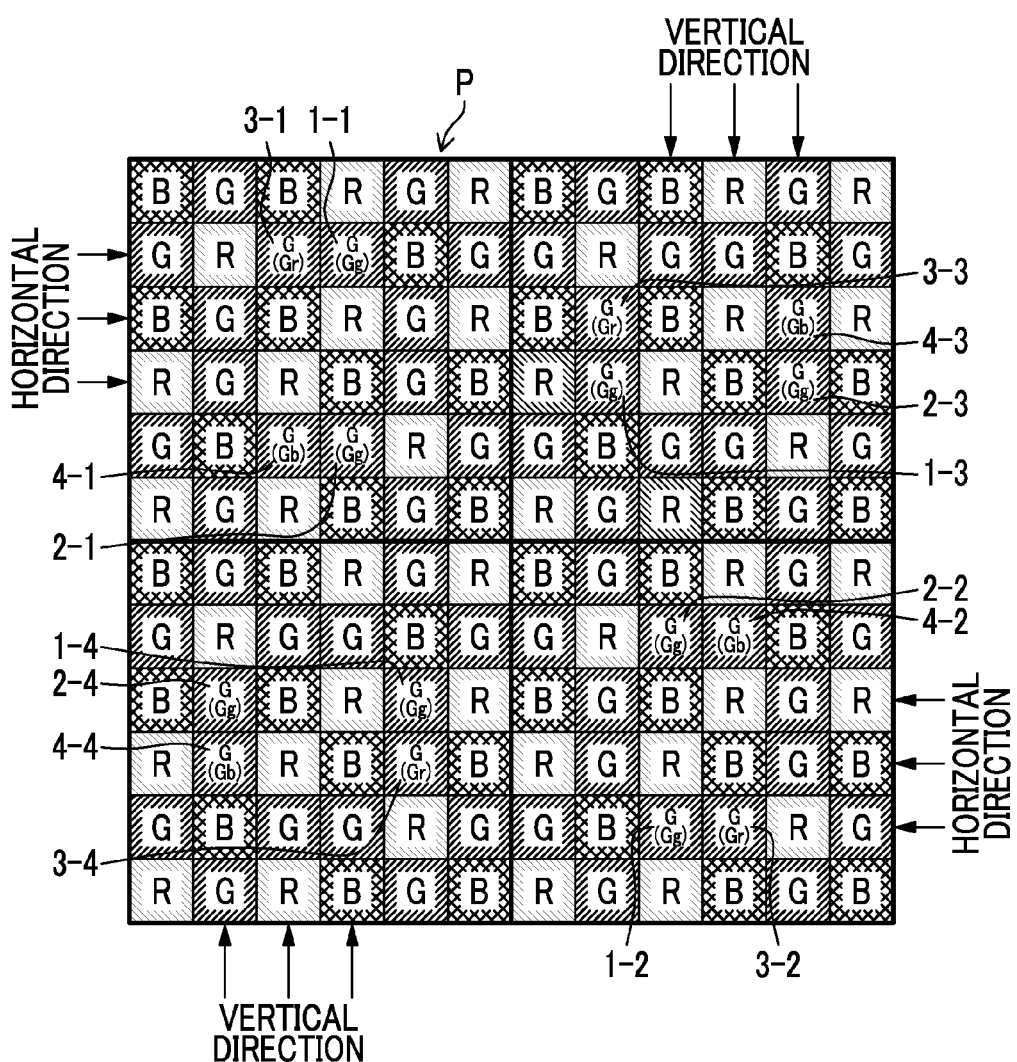
FIG. 10 is a diagram illustrating another color filter array of color filters provided in the imaging element.

FIG. 10 is a diagram illustrating the imaging element 22 according to another embodiment, and particularly shows a color filter array which is disposed on the light receiving surface of the imaging element 22.

In a color filter array shown in FIG. 10, a plurality of basic array pixel groups P, each of which is constituted of pixels formed in an array of 6×6 pixels in the horizontal direction and the vertical direction, is arranged in the horizontal direction and the vertical direction.

The color filter array shown in FIG. 10 includes basic array pixel groups P (pixel groups indicated by the thick frame) each of which is formed in a square array pattern corresponding to 6×6 pixels, and the basic array pixel groups P are disposed to be repeated in the horizontal direction and the vertical direction. That is, in the color filter array, the R, and B filters are arranged with a predetermined periodicity.

As described above, since the R, and B filters are arranged with a predetermined periodicity, when demosaic processing and the like are performed on R, and B signals which are read from the imaging element 22, the processing can be performed in accordance with the repeated pattern.

In each of the basic array pixel groups P constituting the color filter array shown in FIG. 10, one or more G filters, one or more R filters, and one or more B filters are disposed in each line in the horizontal direction and the vertical direction in the basic array pixel group P. The G filters correspond to a color (G color) most contributing to the luminance signal. The R and B filters correspond to colors (R and B) other than the G color.

The R, and B filters are disposed in lines in the horizontal direction and the vertical direction in each basic array pixel group P, and thus it is possible to prevent occurrence of color moire (false color). Thereby, since it is possible to prevent occurrence of false color, an optical low-pass filter can be set not to be disposed in the optical path from the incident surface to the imaging surface of the optical system. Alternatively, since it is possible to prevent occurrence of false color even when an optical low-pass filter is applied, a low-pass filter, of which a function of cutting high frequency components is weak, can be applied. As a result, it is possible to prevent resolution from being lowered.

The G filters corresponding to luminance pixels are disposed such that two or more adjacent G filters are included in the basic array pixel group P in each of the horizontal, vertical, and oblique directions.

Each basic array pixel group P includes two first sub-arrays and two second sub-arrays each of which is constituted of pixels formed in an array of 3×3 pixels in the horizontal direction and the vertical direction.

Figure 11:
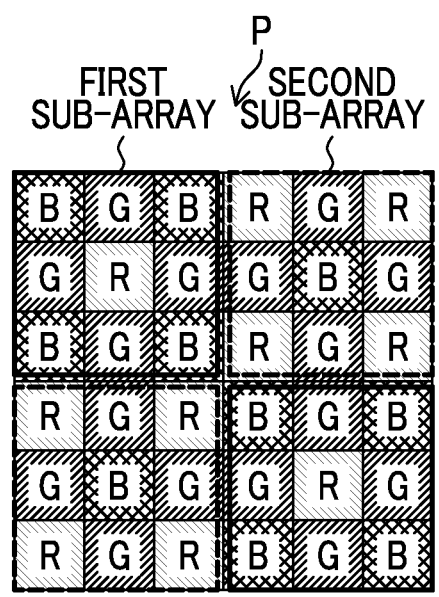
FIG. 11 is a diagram illustrating a situation in which a basic array pixel group of the color filter array shown in FIG. 10 is divided into first sub-arrays and second sub-arrays.

FIG. 11 shows a situation in which the basic array pixel group P shown in FIG. 10 is divided into four parts each of which is formed of 3×3 pixels.

In FIG. 11, each first sub-array has a single pixel which has the R filter and is disposed at the center of the array, four pixels which have the B filters and are disposed at four corners, and four pixels which have the G filters and which are disposed between each of pixels at the four corners. Further, in FIG. 11, each second sub-array has a single pixel which has the B filter and is disposed at the center of the array, four pixels which have the R filters and are disposed at four corners, and four pixels which have the G filters and which are disposed between each of pixels at the four corners. The first sub-arrays are disposed to be adjacent to the second sub-arrays in the horizontal direction and the vertical direction.

As shown in FIG. 11, it can be seen that, in the basic array pixel group P, the first sub-arrays, each of which has 3×3 pixels surrounded by the frame of the solid line, and the second sub-arrays, each of which has 3×3 pixels surrounded by the frame of the dashed line, are alternately arranged in the horizontal and vertical directions.

In each first sub-array, an R filter is disposed at the center, B filters are disposed at the four corners, and G filters are disposed on the upper, lower, right, and left sides with the central R filter interposed therebetween. In contrast, in each second sub-array, a B filter is disposed at the center, R filters are disposed at the four corners, and G filters are disposed on the upper, lower, right, and left sides with the central B filter interposed therebetween. The first sub-array and the second sub-array are arranged in a similar manner except that a positional relationship between the R filter and the B filter is reversed.

[Abnormal Oblique-Incident-Light Detection]

In the case of the image capture device 10 having the imaging element 22 of Modification Example 1 shown in FIG. 10, the abnormal oblique-incident-light detection portion 34 detects abnormal oblique incident light and specifies the direction thereof in the following manner.

In Modification Example 1 shown in FIG. 10, detailed description will be given of detection of abnormal oblique incident light which is incident from the left side in the horizontal direction on the page, where the detection is performed by the abnormal oblique-incident-light detection portion 34. A pixel indicated by the reference numeral 1-1 of FIG. 10 and has the G filter, is disposed to be adjacent to a pixel (the reference numeral 3-1 of FIG. 10) which has a G filter on the left side on the page in FIG. 10, and is a pixel (first first-direction same-color adjacent pixel) which is disposed to be adjacent to a pixel having a color filter with the same color. A pixel indicated by the reference numeral 2-1 of FIG. 10 and has the G filter, is disposed to be adjacent to a pixel (the reference numeral 4-1 of FIG. 10) which has a G filter on the left side on the page in FIG. 10, and is a pixel (second first-direction same-color adjacent pixel) which is disposed to be adjacent to a pixel having a color filter with the same color.

A pixel, which is indicated by the reference numeral 3-1 of FIG. 10 and has the G filter, is disposed to be adjacent to a pixel which has the R filter with a color different from that of the G filter on the left side on the page in FIG. 10. The pixel, which has the G filter, is a pixel (first first-direction different-color adjacent pixel) which is disposed to be adjacent to a pixel having a color filter with a color different from the first color. Further, a pixel, which is indicated by the reference numeral 4-1 of FIG. 10 and has the G filter, is disposed to be adjacent to a pixel which has the B filter with a color different from that of the G filter on the left side on the page in FIG. 10. The pixel, which has the G filter, is a pixel (second first-direction different-color adjacent pixel) which is disposed to be adjacent to a pixel having a color filter with a color different from the first color.

Then, the abnormal oblique-incident-light detection portion 34 compares pixel data of: the above-mentioned first first-direction same-color adjacent pixel (the reference numeral 1-1 of FIG. 10); the above-mentioned second first-direction same-color adjacent pixel (the reference numeral 2-1 of FIG. 10); the above-mentioned first first-direction different-color adjacent pixel (the reference numeral 3-1 of FIG. 10); and the above-mentioned second first-direction different-color adjacent pixel (the reference numeral 4-1 of FIG. 10). If a value of the first first-direction same-color adjacent pixel (the reference numeral 1-1 of FIG. 10) is the same as a value of the second first-direction same-color adjacent pixel (the reference numeral 2-1 of FIG. 10) and a value of the first first-direction different-color adjacent pixel (the reference numeral 3-1 of FIG. 10) is different from a value of the second first-direction different-color adjacent pixel (the reference numeral 4-1 of FIG. 10), presence of abnormal oblique incident light, which is incident from the left side in the horizontal direction on the page, is detected.

In Modification Example 1 shown in FIG. 10, detailed description will be given of detection of abnormal oblique incident light which is incident from the right side in the horizontal direction on the page, where the detection is performed by the abnormal oblique-incident-light detection portion 34. A pixel, which is indicated by the reference numeral 1-2 of FIG. 10 and has the G filter, is disposed to be adjacent to a pixel (the reference numeral 3-2 of FIG. 10) which has a G filter on the right side on the page in FIG. 10. The pixel, which has the G filter, is a pixel (first first-direction same-color adjacent pixel) which is disposed to be adjacent to a pixel which has a color filter with the same color. A pixel, which is indicated by the reference numeral 2-2 of FIG. 10 and has the G filter, is disposed to be adjacent to a pixel (the reference numeral 4-2 of FIG. 10) which has a G filter on the right side on the page in FIG. 10. The pixel, which has the G filter, is a pixel (second first-direction same-color adjacent pixel) which is disposed to be adjacent to a pixel which has a color filter with the same color.

A pixel, which is indicated by the reference numeral 3-2 of FIG. 10 and has the G filter, is disposed to be adjacent to a pixel which has the R filter with a color different from that of the G filter on the right side on the page in FIG. 10. The pixel, which has the G filter, is a pixel (first first-direction different-color adjacent pixel) which is disposed to be adjacent to a pixel having a color filter with a color different from the first color. Further, a pixel, which is indicated by the reference numeral 4-2 of FIG. 10 and has the G filter, is disposed to be adjacent to a pixel which has the B filter with a color different from that of the G filter on the right side on the page in FIG. 10. The pixel, which has the G filter, is a pixel (second first-direction different-color adjacent pixel) which is disposed to be adjacent to a pixel having a color filter with a color different from the first color.

Then, the abnormal oblique-incident-light detection portion 34 compares pixel data of: the above-mentioned first first-direction same-color adjacent pixel (the reference numeral 1-2 of FIG. 10); the above-mentioned second first-direction same-color adjacent pixel (the reference numeral 2-2 of FIG. 10); the above-mentioned first first-direction different-color adjacent pixel (the reference numeral 3-2 of FIG. 10); and the above-mentioned second first-direction different-color adjacent pixel (the reference numeral 4-2 of FIG. 10). If a value of the first first-direction same-color adjacent pixel (the reference numeral 1-2 of FIG. 10) is the same as a value of the second first-direction same-color adjacent pixel (the reference numeral 2-2 of FIG. 10) and a value of the first first-direction different-color adjacent pixel (the reference numeral 3-2 of FIG. 10) is different from a value of the second first-direction different-color adjacent pixel (the reference numeral 4-2 of FIG. 10), presence of abnormal oblique incident light, which is incident from the right side in the horizontal direction on the page, is detected.

Next, description will be given of a case of detecting abnormal oblique incident light which is incident from the upper side in the vertical direction on the page. In Modification Example 1 shown in FIG. 10, the abnormal oblique-incident-light detection portion 34 detects abnormal oblique incident light which is incident from the upper side in the vertical direction on the page in the following manner.

A pixel, which is indicated by the reference numeral 1-3 of FIG. 10 and has the G filter, is disposed to be adjacent to a pixel (the reference numeral 3-3 of FIG. 10) which has the G filter on the upper side on the page in FIG. 10. The pixel, which has the G filter, is a pixel (first second-direction same-color adjacent pixel) which is disposed to be adjacent to a pixel having a G filter. A pixel, which is indicated by the reference numeral 2-3 of FIG. 10 and has the G filter, is disposed to be adjacent to a pixel (the reference numeral 4-3 of FIG. 10) which has the G filter on the upper side on the page in FIG. 10. The pixel, which has the G filter, is a pixel (second second-direction same-color adjacent pixel) which is disposed to be adjacent to a pixel having a G filter.

A pixel, which is indicated by the reference numeral 3-3 of FIG. 10 and has the G filter, is disposed to be adjacent to a pixel which has the R filter with a color different from that of the G filter on the upper side on the page in FIG. 10. The pixel, which has the G filter, is a pixel (first second-direction different-color adjacent pixel) which is disposed to be adjacent to a pixel having a color filter with a color different from that of the G filter. Further, a pixel, which is indicated by the reference numeral 4-3 of FIG. 10 and has the G filter, is disposed to be adjacent to a pixel which has the B filter with a color different from that of the G filter on the upper side on the page in FIG. 10. The pixel, which has the G filter, is a pixel (second second-direction different-color adjacent pixel) which is disposed to be adjacent to a pixel having a color filter with a color different from that of the G filter.

Then, the abnormal oblique-incident-light detection portion 34 compares pixel data of: the above-mentioned first second-direction same-color adjacent pixel (the reference numeral 1-3 of FIG. 10); the above-mentioned second second-direction same-color adjacent pixel (the reference numeral 2-3 of FIG. 10); the above-mentioned first second-direction different-color adjacent pixel (the reference numeral 3-3 of FIG. 10); and the above-mentioned second second-direction different-color adjacent pixel (the reference numeral 4-3 of FIG. 10). If a value of the first second-direction same-color adjacent pixel (the reference numeral 1-3 of FIG. 10) is the same as a value of the second second-direction same-color adjacent pixel (the reference numeral 2-3 of FIG. 10) and a value of the first second-direction different-color adjacent pixel (the reference numeral 3-3 of FIG. 10) is different from a value of the second second-direction different-color adjacent pixel (the reference numeral 4-3 of FIG. 10), presence of abnormal oblique incident light, which is incident in the vertical direction, is detected.

In a case of detecting abnormal oblique incident light which is incident from the lower side in the vertical direction on the page, the detection is performed as follows. In Modification Example 1 shown in FIG. 10, detailed description will be given of detection of abnormal oblique incident light which is incident from the lower side in the vertical direction on the page, where the detection is performed by the abnormal oblique-incident-light detection portion 34.

A pixel, which is indicated by the reference numeral 1-4 of FIG. 10 and has the G filter, is disposed to be adjacent to a pixel (the reference numeral 3-4 of FIG. 10) which has the G filter on the lower side of FIG. 10. The pixel, which has the G filter, is a pixel (first second-direction same-color adjacent pixel) which is disposed to be adjacent to a pixel having a G filter. A pixel, which is indicated by the reference numeral 2-4 of FIG. 10 and has the G filter, is disposed to be adjacent to a pixel (the reference numeral 4-4 of FIG. 10) which has the G filter on the lower side of FIG. 10. The pixel, which has the G filter, is a pixel (second second-direction same-color adjacent pixel) which is disposed to be adjacent to a pixel having a G filter.

A pixel, which is indicated by the reference numeral 3-4 of FIG. 10 and has the G filter, is disposed to be adjacent to a pixel which has the R filter with a color different from that of the G filter on the lower side of FIG. 10. The pixel, which has the G filter, is a pixel (first second-direction different-color adjacent pixel) which is disposed to be adjacent to a pixel having a color filter with a color different from that of the G filter. Further, a pixel, which is indicated by the reference numeral 4-4 of FIG. 10 and has the G filter, is disposed to be adjacent to a pixel which has the B filter with a color different from that of the G filter on the lower side of FIG. 10. The pixel, which has the G filter, is a pixel (second second-direction different-color adjacent pixel) which is disposed to be adjacent to a pixel having a color filter with a color different from that of the G filter.

Then, the abnormal oblique-incident-light detection portion 34 compares pixel data of: the above-mentioned first second-direction same-color adjacent pixel (the reference numeral 1-4 of FIG. 10); the above-mentioned second second-direction same-color adjacent pixel (the reference numeral 2-4 of FIG. 10); the above-mentioned first second-direction different-color adjacent pixel (the reference numeral 3-4 of FIG. 10); and the above-mentioned second second-direction different-color adjacent pixel (the reference numeral 4-4 of FIG. 10). If a value of the first second-direction same-color adjacent pixel (the reference numeral 1-4 of FIG. 10) is the same as a value of the second second-direction same-color adjacent pixel (the reference numeral 2-4 of FIG. 10) and a value of the first second-direction different-color adjacent pixel (the reference numeral 3-4 of FIG. 10) is different from a value of the second second-direction different-color adjacent pixel (the reference numeral 4-4 of FIG. 10), presence of abnormal oblique incident light, which is incident in the vertical direction, is detected.

In addition, for clarification of description, in FIG. 10, it is assumed that pixels disposed in another adjacent basic array pixel group P perform detection: detection of abnormal oblique incident light which is incident from the left side in the horizontal direction on the page, where the detection is performed by the pixels of the reference numerals 1-1 to 4-1; detection of abnormal oblique incident light which is incident from the right side in the horizontal direction on the page, where the detection is performed by the pixels of the reference numerals 1-2 to 4-2; detection of abnormal oblique incident light which is incident in the vertical direction, where the detection is performed by the pixels of the reference numerals 1-3 to 4-3; and detection of abnormal oblique incident light which is incident in the vertical direction, where the detection is performed by the pixels of the reference numerals 1-4 to 4-4. However, in the same basic array pixel group P, the detection may be performed by the pixels corresponding to the pixels of the reference numerals 1-1 to 4-1, the pixels of the reference numerals 1-2 to 4-2, the pixels of the reference numerals 1-3 to 4-3, and the pixels of the reference numerals 1-4 to 4-4.

<Another Embodiment (Modification Example 2) of Imaging Element>

Figure 12:
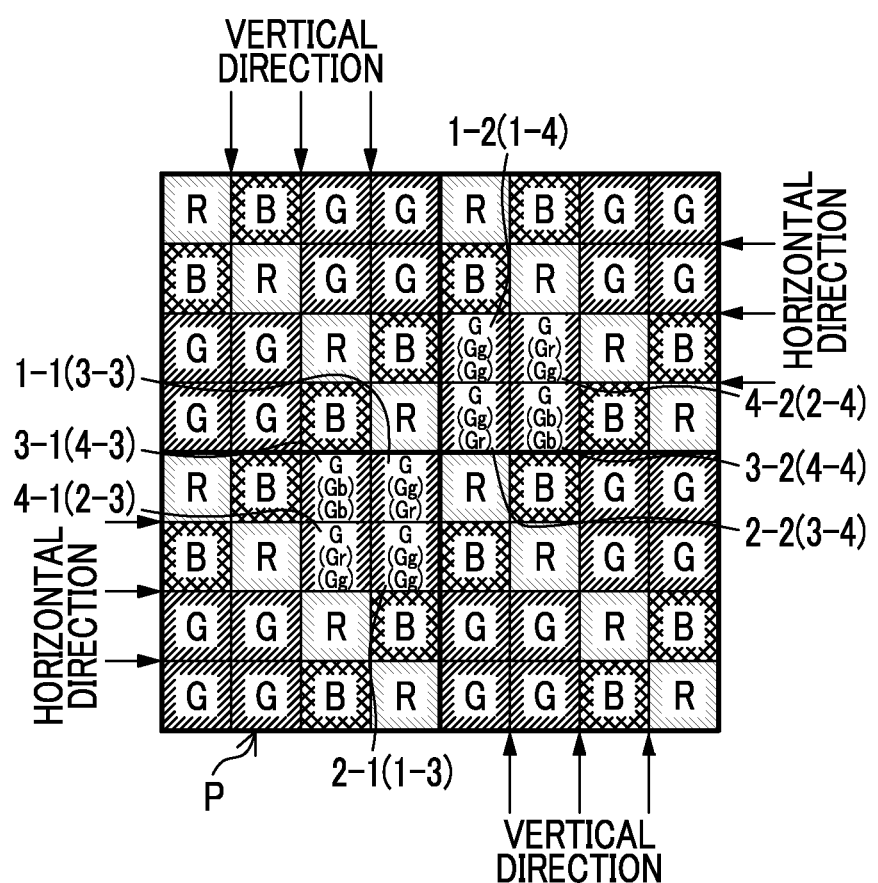
FIG. 12 is a diagram illustrating another color filter array of color filters provided in the imaging element.

FIG. 12 is a diagram illustrating the imaging element 22 according to another embodiment (Modification Example 2), and particularly shows a color filter array which is disposed on the light receiving surface of the imaging element 22.

A color filter array shown in FIG. 12 has a plurality of basic array pixel groups P each of which is constituted of pixels formed in an array of 4×4 pixels in the horizontal direction and the vertical direction. Further, the color filter array includes the plurality of basic array pixel groups P arranged in the horizontal direction and the vertical direction. Each basic array pixel group P includes two first sub-arrays and two second sub-arrays each of which is constituted of pixels formed in an array of 2×2 pixels in the horizontal direction and the vertical direction.

Each first sub-array is constituted of two pixels having R filters and two pixels having B filters, and each second sub-array is constituted of four pixels having G filters. The first sub-arrays are disposed to be adjacent to the second sub-arrays in the horizontal direction and the vertical direction, and a first-color pixel group is constituted of the second sub-array.

Specifically, the color filter array of FIG. 12 includes basic array pixel groups P (pixel groups indicated by the thick frame) each of which is formed in a square array pattern corresponding to 4×4 pixels, and the basic array pixel groups P are disposed to be repeated in the horizontal direction and the vertical direction. That is, in the color filter array, the R, and B filters are arranged with a predetermined periodicity.

As described above, since the R, and B filters are arranged with a predetermined periodicity, when demosaic processing and the like are performed on R, and B signals which are read from the imaging element 22, the processing can be performed in accordance with the repeated pattern.

In the color filter array shown in FIG. 12, the filters with all colors of R, and B are disposed in lines in the horizontal direction and the vertical direction in the basic array pixel groups P.

Figure 13:
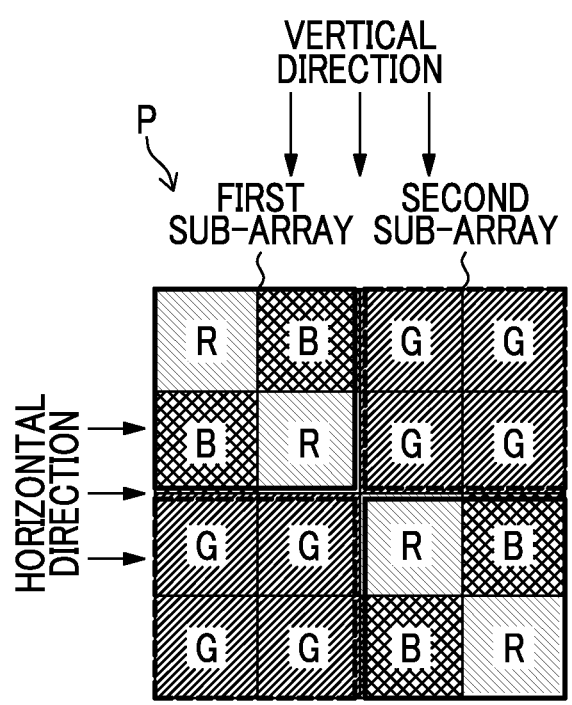
FIG. 13 is a diagram illustrating a situation in which a basic array pixel group of the color filter array shown in FIG. 12 is divided into first sub-arrays and second sub-arrays.

FIG. 13 shows a situation in which the basic array pixel group P shown in FIG. 12 is divided into four parts each of which is formed of 2×2 pixels.

As shown in FIG. 13, in the basic array pixel group P, the first sub-arrays, each of which has 2×2 pixels surrounded by the frame of the solid line, and the second sub-arrays, each of which has 2×2 pixels surrounded by the frame of the dashed line, are alternately arranged in the horizontal and vertical directions.

Each first sub-array is formed as an array of R filters and B filters alternately arranged in the horizontal and vertical directions. Further, it may be said that, in the first sub-array, the pixels having the R filters or the B filters are diagonally arranged in an array of 2×2 pixels.

On the other hand, each second sub-array is formed as an array of 2×2 pixels having G filters. The array of 2×2 pixels having the G filters is a pixel group of the pixels having the G filters. The pixel groups include the first first-direction same-color adjacent pixels, the second first-direction same-color adjacent pixels, the first first-direction different-color adjacent pixels, and the second first-direction different-color adjacent pixels, and include the first second-direction same-color adjacent pixels, the second second-direction same-color adjacent pixels, the first second-direction different-color adjacent pixels, and the second second-direction different-color adjacent pixels.

[Abnormal Oblique-Incident-Light Detection]

In the example shown in FIG. 12, detailed description will be given of detection of abnormal oblique incident light which is incident from the left side in the horizontal direction on the page, where the detection is performed by the abnormal oblique-incident-light detection portion 34 of the image capture device 10 having the imaging element 22 of Modification Example 1.

A pixel, which is indicated by the reference numeral 1-1 of FIG. 12 and has the G filter, is disposed to be adjacent to a pixel (the reference numeral 3-1 of FIG. 12) which has the G filter on the left side on the page in FIG. 12. The pixel, which has the G filter, is a pixel (first first-direction same-color adjacent pixel) which is disposed to be adjacent to a pixel having a color filter with the same color. A pixel, which is indicated by the reference numeral 2-1 of FIG. 12 and has the G filter, is disposed to be adjacent to a pixel (the reference numeral 4-1 of FIG. 12) which has the G filter on the left side on the page in FIG. 12. The pixel, which has the G filter, is a pixel (second first-direction same-color adjacent pixel) which is disposed to be adjacent to a pixel having a color filter with the same color.

A pixel, which is indicated by the reference numeral 3-1 of FIG. 12 and has the G filter, is disposed to be adjacent to a pixel which has the B filter with a different color on the left side on the page in FIG. 12. The pixel, which has the G filter, is a pixel (first first-direction different-color adjacent pixel) which is disposed to be adjacent to a pixel having a color filter with a different color. Further, a pixel, which is indicated by the reference numeral 4-1 of FIG. 12 and has the G filter, is disposed to be adjacent to a pixel which has the R filter with a different color on the left side on the page in FIG. 12. The pixel, which has the G filter, is a pixel (second first-direction different-color adjacent pixel) which is disposed to be adjacent to a pixel having a color filter with a different color.

Then, the abnormal oblique-incident-light detection portion 34 compares pixel data of: the above-mentioned first first-direction same-color adjacent pixel (the reference numeral 1-1 of FIG. 12); the above-mentioned second first-direction same-color adjacent pixel (the reference numeral 2-1 of FIG. 12); the above-mentioned first first-direction different-color adjacent pixel (the reference numeral 3-1 of FIG. 12); and the above-mentioned second first-direction different-color adjacent pixel (the reference numeral 4-1 of FIG. 12). If a value of the first first-direction same-color adjacent pixel (the reference numeral 1-1 of FIG. 12) is the same as a value of the second first-direction same-color adjacent pixel (the reference numeral 2-1 of FIG. 12) and a value of the first first-direction different-color adjacent pixel (the reference numeral 3-1 of FIG. 12) is different from a value of the second first-direction different-color adjacent pixel (the reference numeral 4-1 of FIG. 12), presence of abnormal oblique incident light, which is incident in the first direction, is detected.

Detailed description will be given of detection of abnormal oblique incident light which is incident from the right side in the horizontal direction on the page, where the detection is performed by the abnormal oblique-incident-light detection portion 34 of the image capture device 10 having the imaging element 22 of Modification Example 1 shown in FIG. 12.

A pixel, which is indicated by the reference numeral 1-2 of FIG. 12 and has the G filter, is disposed to be adjacent to a pixel (the reference numeral 4-2 of FIG. 12) which has the G filter on the right side on the page in FIG. 12. The pixel, which has the G filter, is a pixel (first first-direction same-color adjacent pixel) which is disposed to be adjacent to a pixel having a color filter with the same color. A pixel, which is indicated by the reference numeral 2-2 of FIG. 12 and has the G filter, is disposed to be adjacent to a pixel (the reference numeral 3-2 of FIG. 12) which has the G filter on the right side on the page in FIG. 12. The pixel, which has the G filter, is a pixel (second first-direction same-color adjacent pixel) which is disposed to be adjacent to a pixel having a color filter with the same color.

A pixel, which is indicated by the reference numeral 3-2 of FIG. 12 and has the G filter, is disposed to be adjacent to a pixel which has the B filter with a different color on the right side on the page in FIG. 12. The pixel, which has the G filter, is a pixel (first first-direction different-color adjacent pixel) which is disposed to be adjacent to a pixel having a color filter with a different color. Further, a pixel, which is indicated by the reference numeral 4-2 of FIG. 12 and has the G filter, is disposed to be adjacent to a pixel which has the R filter with a different color on the right side on the page in FIG. 12. The pixel, which has the G filter, is a pixel (second first-direction different-color adjacent pixel) which is disposed to be adjacent to a pixel having a color filter with a different color.

Then, the abnormal oblique-incident-light detection portion 34 compares pixel data of: the above-mentioned first first-direction same-color adjacent pixel (the reference numeral 1-2 of FIG. 12); the above-mentioned second first-direction same-color adjacent pixel (the reference numeral 2-2 of FIG. 12); the above-mentioned first first-direction different-color adjacent pixel (the reference numeral 3-2 of FIG. 12); and the above-mentioned second first-direction different-color adjacent pixel (the reference numeral 4-2 of FIG. 12). If a value of the first first-direction same-color adjacent pixel (the reference numeral 1-2 of FIG. 12) is the same as a value of the second first-direction same-color adjacent pixel (the reference numeral 2-2 of FIG. 12) and a value of the first first-direction different-color adjacent pixel (the reference numeral 3-2 of FIG. 12) is different from a value of the second first-direction different-color adjacent pixel (the reference numeral 4-2 of FIG. 12), presence of abnormal oblique incident light, which is incident in the first direction, is detected.

Description will be given of detection of abnormal oblique incident light which is incident from the upper side in the vertical direction on the page, where the detection is performed by the abnormal oblique-incident-light detection portion 34 of the image capture device 10 having the imaging element 22 of Modification Example 1 shown in FIG. 12.

A pixel, which is indicated by the reference numeral 1-3 of FIG. 12 and has the G filter, is disposed to be adjacent to a pixel (the reference numeral 3-3 of FIG. 12) which has the G filter on the upper side on the page in FIG. 12. The pixel, which has the G filter, is a pixel (first second-direction same-color adjacent pixel) which is disposed to be adjacent to a pixel having a color filter with the same color. A pixel, which is indicated by the reference numeral 2-3 of FIG. 12 and has the G filter, is disposed to be adjacent to a pixel (the reference numeral 4-3 of FIG. 12) which has the G filter on the upper side on the page in FIG. 12. The pixel, which has the G filter, is a pixel (second second-direction same-color adjacent pixel) which is disposed to be adjacent to a pixel having a color filter with the same color.

A pixel, which is indicated by the reference numeral 3-3 of FIG. 12 and has the G filter, is disposed to be adjacent to a pixel which has the R filter with a different color on the upper side on the page in FIG. 12. The pixel, which has the G filter, is a pixel (first second-direction different-color adjacent pixel) which is disposed to be adjacent to a pixel having a color filter with a different color. Further, a pixel, which is indicated by the reference numeral 4-3 of FIG. 12 and has the G filter, is disposed to be adjacent to a pixel which has the B filter with a different color on the upper side on the page in FIG. 12. The pixel, which has the G filter, is a pixel (second second-direction different-color adjacent pixel) which is disposed to be adjacent to a pixel having a color filter with a different color.

Then, the abnormal oblique-incident-light detection portion 34 compares pixel data of: the above-mentioned first second-direction same-color adjacent pixel (the reference numeral 1-3 of FIG. 12); the above-mentioned second second-direction same-color adjacent pixel (the reference numeral 2-3 of FIG. 12); the above-mentioned first second-direction different-color adjacent pixel (the reference numeral 3-3 of FIG. 12); and the above-mentioned second second-direction different-color adjacent pixel (the reference numeral 4-3 of FIG. 12). If a value of the first second-direction same-color adjacent pixel (the reference numeral 1-3 of FIG. 12) is the same as a value of the second second-direction same-color adjacent pixel (the reference numeral 2-3 of FIG. 12) and a value of the first second-direction different-color adjacent pixel (the reference numeral 3-3 of FIG. 12) is different from a value of the second second-direction different-color adjacent pixel (the reference numeral 4-3 of FIG. 12), presence of abnormal oblique incident light, which is incident in the vertical direction, is detected.

Description will be given of detection of abnormal oblique incident light which is incident from the lower side in the vertical direction on the page, where the detection is performed by the abnormal oblique-incident-light detection portion 34 of the image capture device 10 having the imaging element 22 of Modification Example 1 shown in FIG. 12.

A pixel, which is indicated by the reference numeral 1-4 of FIG. 12 and has the G filter, is disposed to be adjacent to a pixel (the reference numeral 3-4 of FIG. 12) which has the G filter on the lower side on the page in FIG. 12. The pixel, which has the G filter, is a pixel (first second-direction same-color adjacent pixel) which is disposed to be adjacent to a pixel having a color filter with the same color. A pixel, which is indicated by the reference numeral 2-4 of FIG. 12 and has the G filter, is disposed to be adjacent to a pixel (the reference numeral 4-4 of FIG. 12) which has the G filter on the lower side on the page in FIG. 12. The pixel, which has the G filter, is a pixel (second second-direction same-color adjacent pixel) which is disposed to be adjacent to a pixel having a color filter with the same color.

A pixel, which is indicated by the reference numeral 3-4 of FIG. 12 and has the G filter, is disposed to be adjacent to a pixel which has the R filter with a different color on the lower side on the page in FIG. 12. The pixel, which has the G filter, is a pixel (first second-direction different-color adjacent pixel) which is disposed to be adjacent to a pixel having a color filter with a different color. Further, a pixel, which is indicated by the reference numeral 4-4 of FIG. 12 and has the G filter, is disposed to be adjacent to a pixel which has the B filter with a different color on the lower side on the page in FIG. 12. The pixel, which has the G filter, is a pixel (second second-direction different-color adjacent pixel) which is disposed to be adjacent to a pixel having a color filter with a different color.

Then, the abnormal oblique-incident-light detection portion 34 compares pixel data of: the above-mentioned first second-direction same-color adjacent pixel (the reference numeral 1-4 of FIG. 12); the above-mentioned second second-direction same-color adjacent pixel (the reference numeral 2-4 of FIG. 12); the above-mentioned first second-direction different-color adjacent pixel (the reference numeral 3-4 of FIG. 12); and the above-mentioned second second-direction different-color adjacent pixel (the reference numeral 4-4 of FIG. 12). If a value of the first second-direction same-color adjacent pixel (the reference numeral 1-4 of FIG. 12) is the same as a value of the second second-direction same-color adjacent pixel (the reference numeral 2-4 of FIG. 12) and a value of the first second-direction different-color adjacent pixel (the reference numeral 3-4 of FIG. 12) is different from a value of the second second-direction different-color adjacent pixel (the reference numeral 4-4 of FIG. 12), presence of abnormal oblique incident light, which is incident in the vertical direction, is detected.

Figure 14:
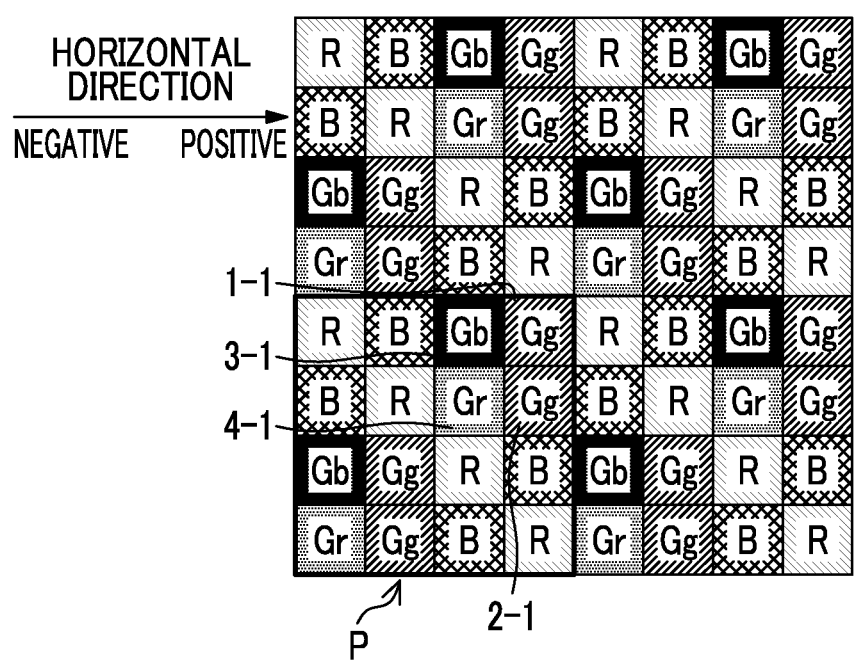
FIG. 14 is a diagram illustrating determination of the incidence direction of the abnormal oblique incident light, in the color filter array shown in FIG. 12.
Figure 15:
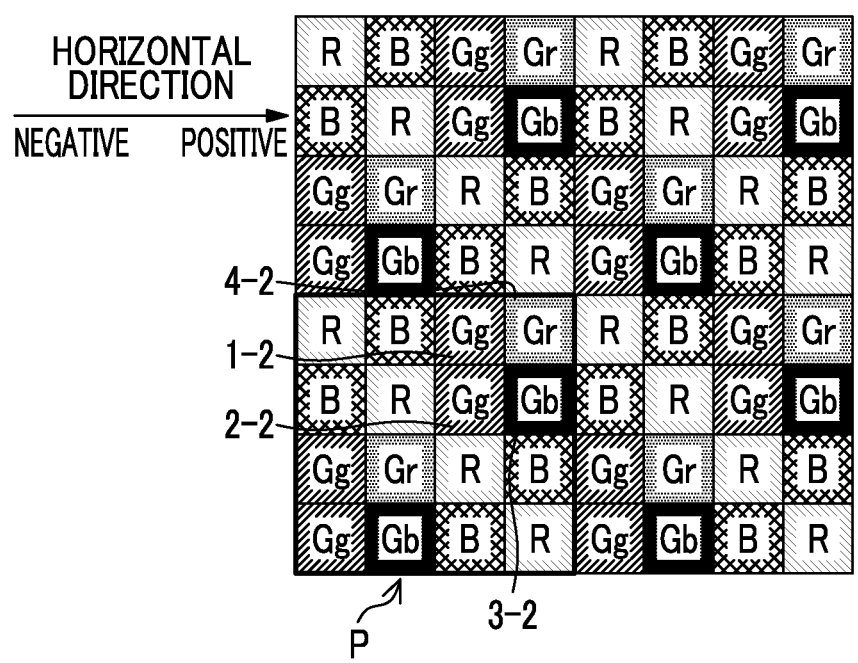
FIG. 15 is a diagram illustrating determination of the incidence direction of the abnormal oblique incident light, in the color filter array shown in FIG. 12.

FIGS. 14 and 15 show a method of determining whether abnormal oblique incident light is incident in a positive direction or a negative direction of the horizontal direction in the imaging element 22 having the color filter array shown in FIG. 12. In FIGS. 14 and 15, a positive direction is assumed as a direction toward the right side of the page, and a negative direction is assumed as a direction toward the left side of the page.

A plurality of pixels shown in FIGS. 14 and 15 includes: first first-color pixels (the reference numeral 3-1 of FIG. 14) (the reference numeral 1-2 of FIG. 15); second first-color pixels (the reference numeral 4-1 of FIG. 14) (the reference numeral 2-2 of FIG. 15); third first-color pixels (the reference numeral 1-1 of FIG. 14) (the reference numeral 4-2 of FIG. 15); and fourth first-color pixels (the reference numeral 2-1 of FIG. 14) (the reference numeral 3-2 of FIG. 15). Each of the first and second first-color pixels has a G filter, and is adjacent to a pixel, which has a G filter, in the positive direction of the horizontal direction and adjacent to a pixel, which has a color filter with a different color from the first color, in the negative direction of the horizontal direction. Each of the third and fourth first-color pixels has a G filter, and is adjacent to a pixel, which has a G filter, in the negative direction of the horizontal direction and adjacent to a pixel, which has a color filter with a different color from the first color, in the positive direction of the horizontal direction.

FIG. 14 shows a situation in which abnormal oblique incident light is incident along the positive direction of the horizontal direction. When abnormal oblique incident light is incident onto the imaging element 22 along the positive direction of the horizontal direction, in the third first-color pixel (the reference numeral 1-1 of FIG. 14), there is color mixture from the adjacent pixel (the reference numeral 3-1 of FIG. 14) having the G filter, and therefore the pixel data is Gg. Further, also in the fourth first-color pixel (the reference numeral 2-1 of FIG. 14), there is color mixture from the adjacent pixel (the reference numeral 2-1 of FIG. 14) having the G filter, and therefore the pixel data is Gg.

On the other hand, in the first first-color pixel (the reference numeral 3-1 of FIG. 14), there is color mixture from the adjacent pixel having the B filter on a side in the negative direction, and therefore the pixel data is Gb. Further, in the second first-color pixel (the reference numeral 4-1 of FIG. 14), there is color mixture from the adjacent pixel having the R filter on a side in the negative direction, and therefore the pixel data is Gr.

As shown in FIG. 14, an output value of Gb is detected from the first first-color pixel (the reference numeral 3-1 of FIG. 14), an output value of Gr is detected from the second first-color pixel (the reference numeral 4-1 of FIG. 14), an output value of Gg is detected from the third first-color pixel (the reference numeral 1-1 of FIG. 14), and an output value of Gg is detected from the fourth first-color pixel (the reference numeral 2-1 of FIG. 14). In this case, it is possible to determine that abnormal oblique incident light is incident along the positive direction of the horizontal direction. Further, it is possible to determine that there is abnormal oblique incident light incident from the first positive direction when the pixel data of the first pixel or the second pixel is Gg.

FIG. 15 shows a situation in which abnormal oblique incident light is incident along the negative direction of the horizontal direction. When abnormal oblique incident light is incident onto the imaging element 22 along the negative direction of the horizontal direction, in the third first-color pixel (the reference numeral 4-2 of FIG. 15), there is color mixture from the adjacent pixel having the R filter on a side in the positive direction, and therefore the pixel data is Gr. Further, also in the fourth first-color pixel (the reference numeral 3-2 of FIG. 15), there is color mixture from the adjacent pixel having the B filter on a side in the positive direction, and therefore the pixel data is Gb.

On the other hand, in the first first-color pixel (the reference numeral 1-2 of FIG. 15), there is color mixture from the adjacent pixel (the reference numeral 4-2 of FIG. 15) having the G filter on a side in the positive direction, and therefore the pixel data is Gg. Further, in the second first-color pixel (the reference numeral 2-2 of FIG. 15), there is color mixture from the adjacent pixel (the reference numeral 3-2 of FIG. 15) having the G filter on a side in the positive direction, and therefore the pixel data is Gg.

As shown in FIG. 15, an output value of Gg is detected from the first first-color pixel (the reference numeral 1-2 of FIG. 15), an output value of Gg is detected from the second first-color pixel (the reference numeral 2-2 of FIG. 15), an output value of Gr is detected from the third first-color pixel (the reference numeral 4-2 of FIG. 15), and an output value of Gb is detected from the fourth first-color pixel (the reference numeral 3-2 of FIG. 15). In this case, it is possible to determine that abnormal oblique incident light is incident along the negative direction of the horizontal direction. Further, it is possible to determine that there is abnormal oblique incident light incident from the negative direction of the horizontal direction when the pixel data of the first pixel or the second pixel is Gg.

Further, when abnormal oblique incident light is detected, it is possible to correct pixel data of pixels having photodiodes, onto which abnormal oblique incident light is incident, by using the pixel data of the pixels, which output the same pixel data, among the first first-color pixel, the second first-color pixel, the third first-color pixel, and the fourth first-color pixel.

In FIGS. 14 and 15, for convenience of description, the horizontal direction in the different embodiment (Modification Example 1) of the imaging element 22 has been described. However, in the embodiment of the imaging element 22 (the imaging element having the color filter array shown in FIGS. 6, 10, and 12), regarding the horizontal direction and the vertical direction, it is possible to determine whether abnormal oblique incident light of the incident light is incident from the positive direction or the negative direction.

<Another Embodiment (Modification Example 3) of Imaging Element>

Figure 16:
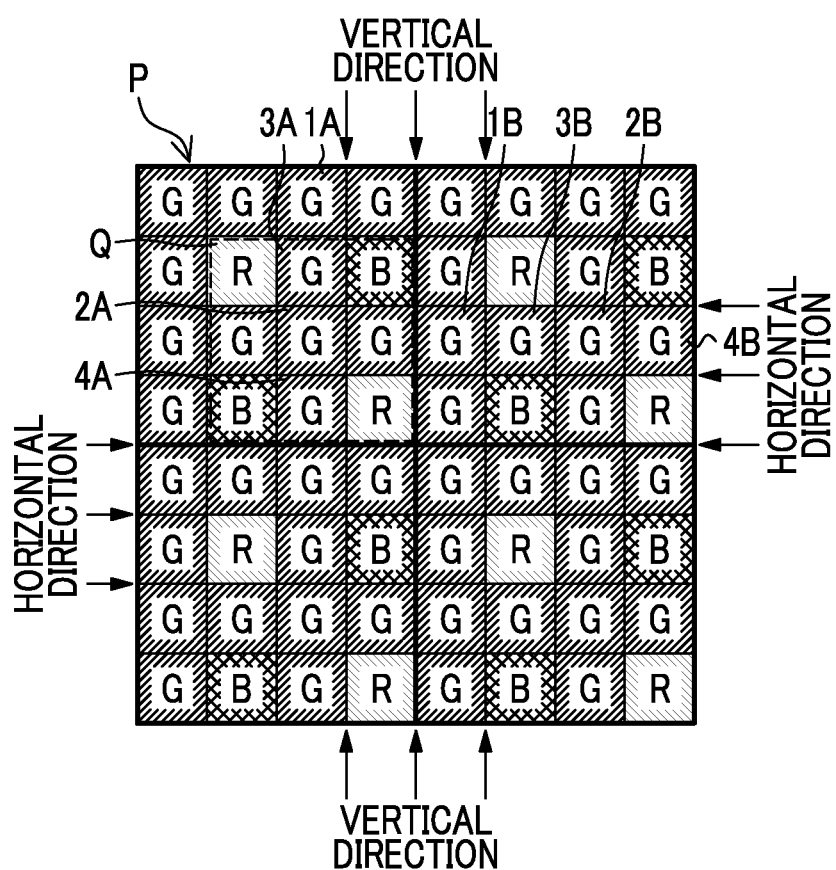
FIG. 16 is a diagram illustrating another color filter array of color filters provided in the imaging element.

FIG. 16 is a diagram illustrating the imaging element 22 according to another embodiment (Modification Example 3), and particularly shows a color filter array which is disposed on the light receiving surface of the imaging element 22.

The color filter array shown in FIG. 16 includes a plurality of basic array pixel groups P each of which is constituted of pixels formed in an array of 4×4 pixels in the horizontal direction and the vertical direction, where the basic array pixel groups P are arranged in the horizontal direction and the vertical direction.

As described above, since the R, and B filters are arranged with a predetermined periodicity, when demosaic processing and the like are performed on R, and B signals which are read from the imaging element 22, the processing can be performed in accordance with the repeated pattern.

In the color filter array shown in FIG. 16, the filters with all colors of R, and B are disposed in lines in the horizontal direction and the vertical direction in the basic array pixel groups P.

A pixel block Q (indicated by the dotted line in FIG. 16) is constituted of two pixels having R filters, two pixels having B filters, and five pixels having G filters in each of the basic array pixel groups P.

Figure 17:
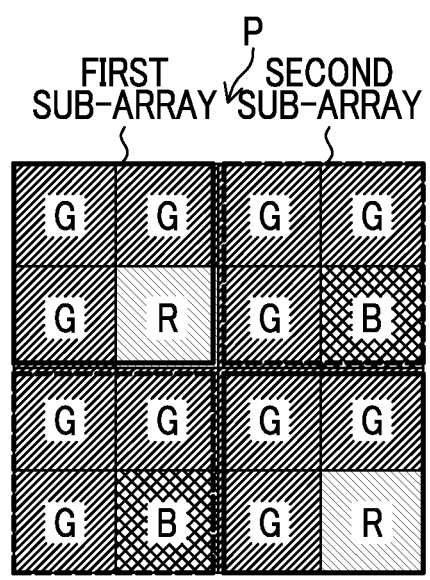
FIG. 17 is a diagram illustrating a situation in which a basic array pixel group of the color filter array shown in FIG. 16 is divided into first sub-arrays and second sub-arrays.

Each basic array pixel group P includes two first sub-arrays and two second sub-arrays each of which is constituted of pixels formed in an array of 2×2 pixels in the horizontal direction and the vertical direction. FIG. 17 shows a situation in which the basic array pixel group P shown in FIG. 16 is divided into four parts each of which is formed of 2×2 pixels.

As shown in FIG. 17, each first sub-array is constituted of three pixels having G filters and a single pixel having an R filter, and each second sub-array is constituted of three pixels having G filters and a single pixel having a B filter. A position of the pixel having the R filter in the first sub-array corresponds to a position of the pixel having the B filter in the second sub-array. The first sub-arrays are disposed to be adjacent to the second sub-arrays in the horizontal direction and the vertical direction.

Specifically, as shown in FIG. 17, in the basic array pixel group P, the first sub-arrays, each of which has 2×2 pixels surrounded by the frame of the solid line, and the second sub-arrays, each of which has 2×2 pixels surrounded by the frame of the dashed line, are alternately arranged in the horizontal and vertical directions.

The first sub-array has three G filters and a single R filter. Further, the second sub-array has three G filters and a single B filter. Furthermore, a position of the R filter in the first sub-array is the same as a position of the B filter in the second sub-array.

[Abnormal Oblique-Incident-Light Detection]

In the example shown in FIG. 16, detailed description will be given of detection of abnormal oblique incident light which is incident in the horizontal direction, where the detection is performed by the abnormal oblique-incident-light detection portion 34. A pixel, which is indicated by the reference numeral 1A of FIG. 16 and has the G filter, is disposed to be adjacent to pixels which have the G filters on the right and left sides on the page in FIG. 16. The pixel, which has the G filter, is a pixel (first first-direction same-color adjacent pixel) which is disposed to be adjacent to pixels having color filters with the same color. A pixel, which is indicated by the reference numeral 2A of FIG. 16 and has the G filter, is disposed to be adjacent to pixels which have the G filters on the right and left sides on the page in FIG. 16. The pixel, which has the G filter, is a pixel (second first-direction same-color adjacent pixel) which is disposed to be adjacent to pixels having color filters with the same color.

A pixel, which is indicated by the reference numeral 3A of FIG. 16 and has the G filter, is disposed to be adjacent to pixels which have an R filter on the left side and a B filter on the right side on the page in FIG. 16. The pixel, which has the G filter, is a pixel (first first-direction different-color adjacent pixel) which is disposed to be adjacent to pixels having color filters with different colors. Further, a pixel, which is indicated by the reference numeral 4A of FIG. 16 and has the G filter, is disposed to be adjacent to pixels which have a B filter on the left side and an R filter on the right side on the page in FIG. 16. The pixel, which has the G filter, is a pixel (second first-direction different-color adjacent pixel) which is disposed to be adjacent to pixels having color filters with different colors.

Then, the abnormal oblique-incident-light detection portion 34 compares pixel data of: the above-mentioned first first-direction same-color adjacent pixel (the reference numeral 1A of FIG. 16); the above-mentioned second first-direction same-color adjacent pixel (the reference numeral 2A of FIG. 16); the above-mentioned first first-direction different-color adjacent pixel (the reference numeral 3A of FIG. 16); and the above-mentioned second first-direction different-color adjacent pixel (the reference numeral 4A of FIG. 16). If a value of the first first-direction same-color adjacent pixel (the reference numeral 1A of FIG. 16) is the same as a value of the second first-direction same-color adjacent pixel (the reference numeral 2A of FIG. 16) and a value of the first first-direction different-color adjacent pixel (the reference numeral 3A of FIG. 16) is different from a value of the second first-direction different-color adjacent pixel (the reference numeral 4A of FIG. 16), presence of abnormal oblique incident light, which is incident in the horizontal direction, is detected.

In a case of detecting abnormal oblique incident light which is incident in the vertical direction, the detection is performed as follows.

In FIG. 16, detailed description will be given of detection of abnormal oblique incident light which is incident in the vertical direction, where the detection is performed by the abnormal oblique-incident-light detection portion 34. A pixel, which is indicated by the reference numeral 1B of FIG. 16 and has the G filter, is disposed to be adjacent to pixels which have G filters on the upper and lower sides on the page in FIG. 16. The pixel, which has the G filter, is a pixel (first second-direction same-color adjacent pixel) which is disposed to be adjacent to pixels having color filters with the same color. A pixel, which is indicated by the reference numeral 2B of FIG. 16 and has the G filter, is disposed to be adjacent to pixels which have G filters on the upper and lower sides on the page in FIG. 16. The pixel, which has the G filter, is a pixel (second second-direction same-color adjacent pixel) which is disposed to be adjacent to pixels having color filters with the same color.

A pixel, which is indicated by the reference numeral 3B of FIG. 16 and has the G filter, is disposed to be adjacent to pixels which have R and B filters with different colors on the upper and lower sides on the page in FIG. 16. The pixel, which has the G filter, is a pixel (first second-direction different-color adjacent pixel) which is disposed to be adjacent to pixels having color filters with different colors. Further, a pixel, which is indicated by the reference numeral 4B of FIG. 16 and has the G filter, is disposed to be adjacent to pixels which have B and R filters with different colors on the upper and lower sides on the page in FIG. 16. The pixel, which has the G filter, is a pixel (second second-direction different-color adjacent pixel) which is disposed to be adjacent to pixels having color filters with different colors.

Then, the abnormal oblique-incident-light detection portion 34 compares pixel data of: the above-mentioned first second-direction same-color adjacent pixel (the reference numeral 1B of FIG. 16); the above-mentioned second second-direction same-color adjacent pixel (the reference numeral 2B of FIG. 16); the above-mentioned first second-direction different-color adjacent pixel (the reference numeral 3B of FIG. 16); and the above-mentioned second second-direction different-color adjacent pixel (the reference numeral 4B of FIG. 16). If a value of the first second-direction same-color adjacent pixel (the reference numeral 1B of FIG. 16) is the same as a value of the second second-direction same-color adjacent pixel (the reference numeral 2B of FIG. 16) and a value of the first second-direction different-color adjacent pixel (the reference numeral 3B of FIG. 16) is different from a value of the second second-direction different-color adjacent pixel (the reference numeral 4B of FIG. 16), presence of abnormal oblique incident light, which is incident in the vertical direction, is detected.

Further, as shown in FIGS. 16 and 17, in another embodiment (Modification Example 3) of the image capture device 10, the pixels having the G filters are continuously arranged in the horizontal direction, or the pixels having the G filters are continuously arranged in the vertical direction. Therefore, it is possible to more easily determine the direction of the abnormal oblique incident light.

Furthermore, the abnormal oblique-incident-light detection portion 34 is able to detect the abnormal oblique incident light, which is incident onto the imaging element 22 in the horizontal direction or vertical direction, on the basis of the pixel data of the five pixels having the G filters included in the pixel block Q (indicated by the dotted line in FIG. 16).

Figure 18:
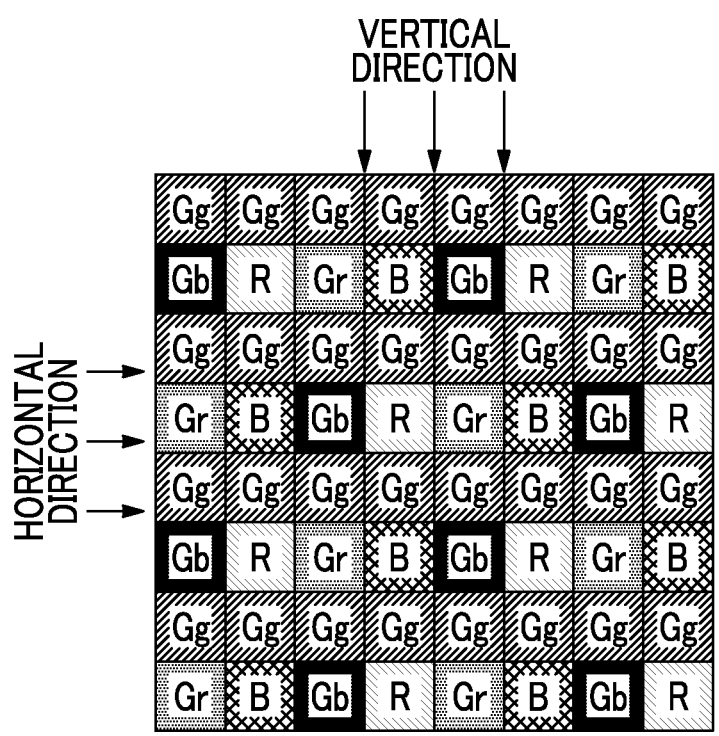
FIG. 18 is a diagram illustrating determination of the incidence direction of the abnormal oblique incident light, in the color filter array shown in FIG. 16.

FIG. 18 shows a case where abnormal oblique incident light is incident in the horizontal direction onto the imaging element 22 having the color filter array shown in FIG. 16. Further, FIG. 19 shows a case where abnormal oblique incident light is incident in the vertical direction onto the imaging element 22 having the color filter array shown in FIG. 16.

In FIG. 18, each piece of the pixel data of the pixels having the G filters continuously arranged in the horizontal direction is Gg. In other words, the pixel data pieces indicating values of Gg are continuously arranged in the horizontal direction. In this case, abnormal oblique incident light, which is incident in the horizontal direction, is detected.

Figure 19:
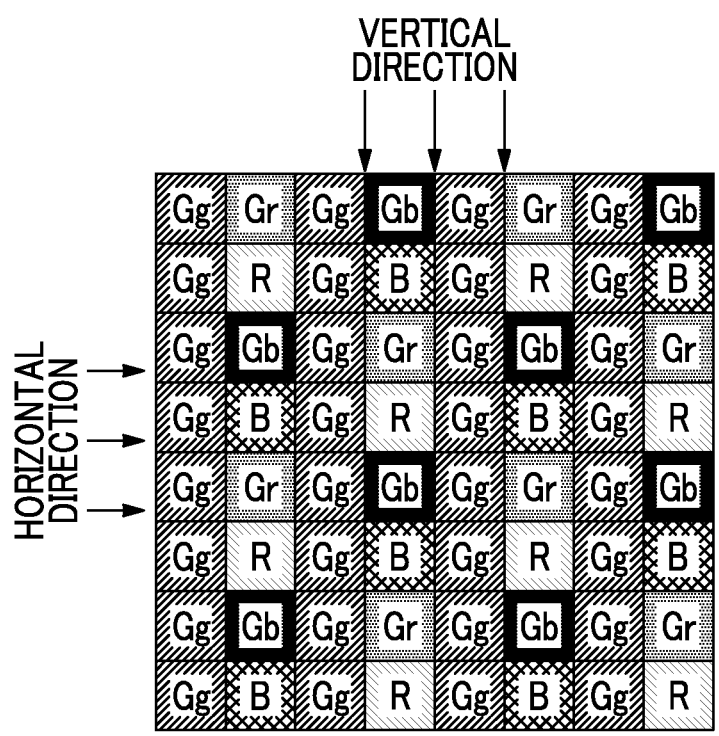
FIG. 19 is a diagram illustrating determination of the incidence direction of the abnormal oblique incident light, in the color filter array shown in FIG. 16.

On the other hand, in FIG. 19, each piece of the pixel data of the pixels having the G filters continuously arranged in the vertical direction is Gg. In other words, the pixel data pieces indicating values of Gg are continuously arranged in the vertical direction. In this case, abnormal oblique incident light, which is incident in the vertical direction, is detected.

Further, a plurality of pixels is constituted of pixels having at least G filters, R filters, and the B filters. Furthermore, the pixel data pieces, which are output by the pixels having the G filters, contribute most to luminance signals.

Furthermore, each pixel with the first color has a green, transparent, or white color filter. The transparent filter and the white filter are filters through which light with a red wavelength region, light with a blue wavelength region, and light with a green wavelength region are transmitted. The transparent filter has a comparatively high optical transmittance (for example, an optical transmittance equal to or greater than 70%), and the white filter has an optical transmittance lower than that of the transparent filter.

It should be noted that the "first direction" and the "second direction" are not particularly limited, and may be directions which are perpendicular (or substantially perpendicular) to each other. For example, a "horizontal direction" and a "vertical direction" of a photographic subject at the time of image capturing performed by an image capture device may be set as the "first direction" and the "second direction", and directions at an arbitrary angle to the "horizontal direction" and the "vertical direction" may be set as the "first direction" and the "second direction". Accordingly, a plurality of pixels may be formed in a so-called "honeycomb-type array" in which a plurality of pixels 2-dimensionally arranged in the horizontal and vertical directions is rotated at 45 degrees. In this case, the directions at an angle of 45 degrees to the "horizontal direction" and the "vertical direction" can be regarded as the "first direction" and the "second direction".

Regarding the color filter array disposed on the light receiving surface of the imaging element 22, arrays other than the arrays described herein can be employed. For example, the following array can be employed: a group of an array which has N×M pixels (N is an integer equal to or greater than 3, and M is an integer equal to or greater than 3) in the first direction and the second direction is set as a basic array pixel group, and the basic array pixel groups are arranged in the first direction and the second direction. It should be noted that each of the basic array pixel groups can employ an array including the first first-direction same-color adjacent pixel, the second first-direction same-color adjacent pixel, the first first-direction different-color adjacent pixel, the second first-direction different-color adjacent pixel, the first second-direction same-color adjacent pixel, the second second-direction same-color adjacent pixel, the first second-direction different-color adjacent pixel, and the second second-direction different-color adjacent pixel. Examples of the corresponding array include an array in which basic array pixel groups P of 3×3 pixels are arranged in the horizontal direction (first direction) and the vertical direction (second direction) as shown in FIG. 20.

Figure 20:
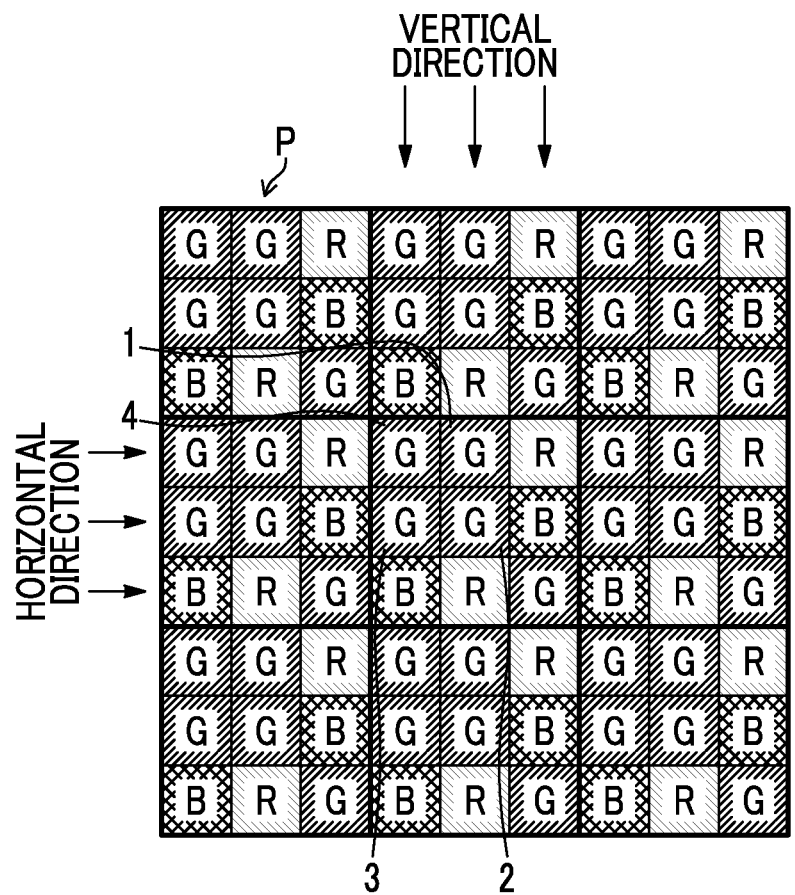
FIG. 20 is a diagram illustrating another color filter array of color filters provided in the imaging element.

For example, a pixel indicated by the reference numeral 1 of FIG. 20 is disposed to be adjacent to a pixel having a G filter with the same color on the left side in the horizontal direction on the page, and is therefore the first first-direction same-color adjacent pixel. Further, the pixel indicated by the reference numeral 1 of FIG. 20 is disposed to be adjacent to a pixel having an R filter with a different color on the upper side in the vertical direction on the page, and is therefore the second second-direction different-color adjacent pixel. A pixel indicated by the reference numeral 2 of FIG. 20 is disposed to be adjacent to a pixel having a G filter with the same color on the left side in the horizontal direction on the page, and is therefore the second first-direction same-color adjacent pixel. Further, the pixel indicated by the reference numeral 2 of FIG. 20 is disposed to be adjacent to a pixel having a G filter with the same color on the upper side in the vertical direction on the page, and is therefore the first second-direction same-color adjacent pixel.

A pixel indicated by the reference numeral 3 of FIG. 20 is disposed to be adjacent to a pixel having a B filter with a different color on the left side in the horizontal direction on the page, and is therefore the first first-direction different-color adjacent pixel. Further, the pixel indicated by the reference numeral 3 of FIG. 20 is disposed to be adjacent to a pixel having a G filter with the same color on the upper side in the vertical direction on the page, and is therefore the second second-direction same-color adjacent pixel. A pixel indicated by the reference numeral 4 of FIG. 20 is disposed to be adjacent to a pixel having an R filter with a different color on the left side in the horizontal direction on the page, and is therefore the second first-direction different-color adjacent pixel. Further, the pixel indicated by the reference numeral 4 of FIG. 20 is disposed to be adjacent to a pixel having a B filter with a different color on the upper side in the vertical direction on the page, and is therefore the first second-direction different-color adjacent pixel.

It should be noted that, regarding the size of the basic array pixel group P, as the number of pixels in the basic array pixel group becomes larger, the signal processing such as demosaic processing becomes more complicated. Consequently, from the viewpoint of preventing the signal processing from being complicated, the size of the basic array pixel group should be set not to be too large. The size is preferably set to be a size equal to or less than that of 10×10 pixels, and more preferably set to be a size equal to or less than that of 8×8 pixels.

<Configuration of Smartphone>

Figure 21:
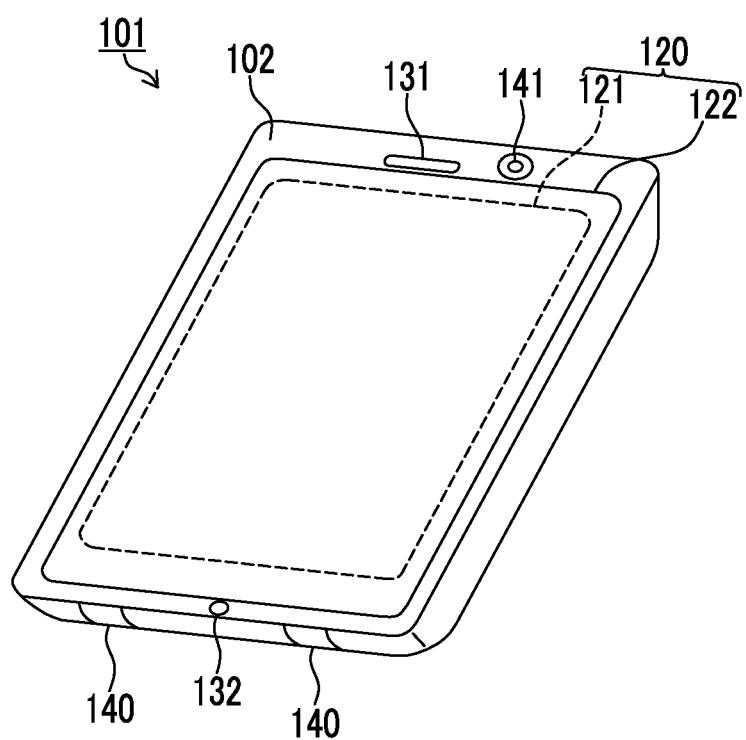
FIG. 21 is an appearance diagram illustrating a smartphone.

FIG. 21 shows an appearance of a smartphone 101 as the image capture device 10 according to an embodiment of the present invention. The smartphone 101 shown in FIG. 21 includes: a casing 102 that has a flat plate shape; a display panel 121 as a display section on one side of the casing 102; and a display input section 120 into which an operation panel 122 as an input section is integrated. Further, the casing 102 includes a speaker 131, a microphone 132, operation sections 140, and a camera section 141. It should be noted that the configuration of the casing 102 is not limited to this. For example, it may be possible to adopt a configuration in which the input section and the display section are independent, or it may be possible to adopt a configuration having a slide mechanism or a folded structure.

Figure 22:
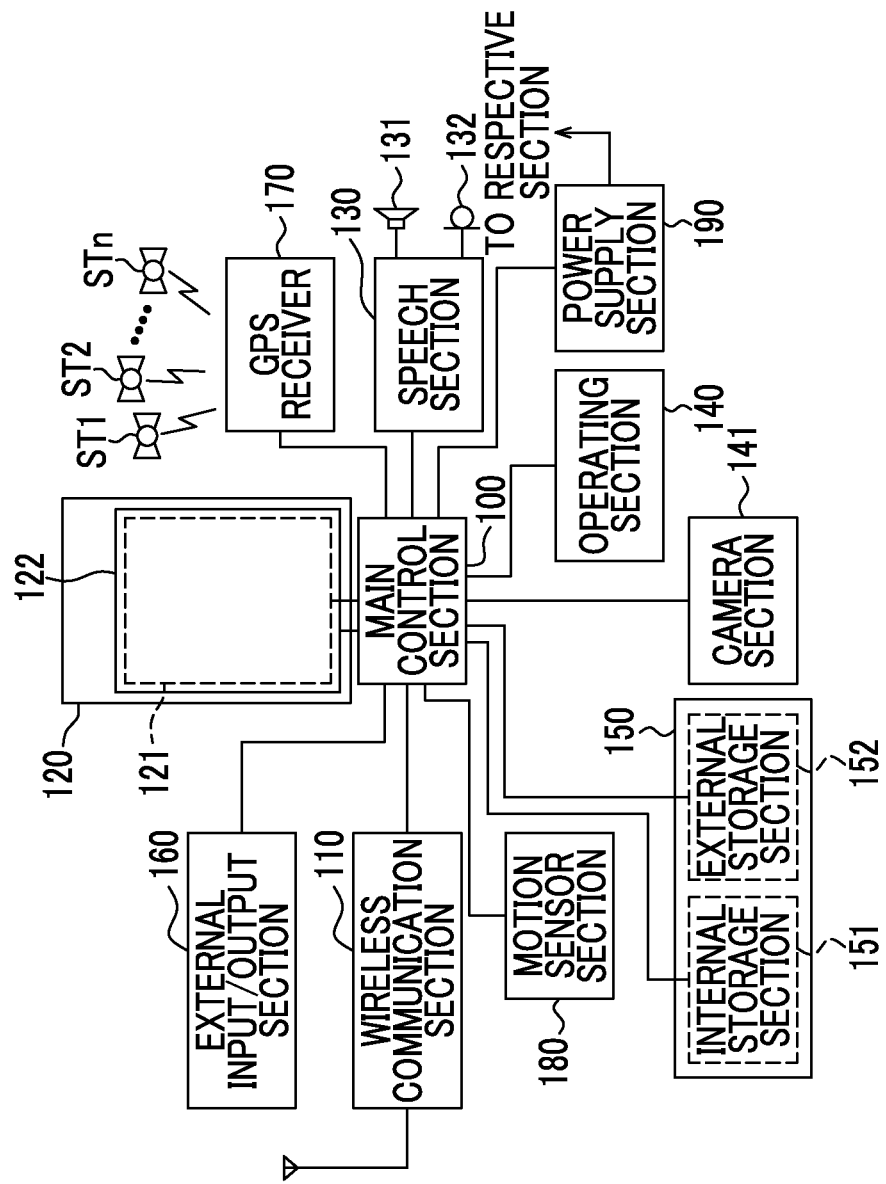
FIG. 22 is a block diagram illustrating a configuration of the smartphone shown in FIG. 21.

FIG. 22 is a block diagram illustrating a configuration of the smartphone 101 shown in FIG. 21. As shown in FIG. 22, the smartphone includes, as main components, a wireless communication section 110, a display input section 120, a speech section 130, the operation sections 140, the camera section 141, a storage section 150, an external input/output section 160, a global positioning system (GPS) receiver 170, a motion sensor section 180, a power supply section 190, and a main control section 100. Further, as the main function of the smartphone 101, there is provided a wireless communication function for performing mobile wireless communication with a base station device BS through a mobile communication network NW.

The wireless communication section 110 performs wireless communication with the base station device BS, which is included in the mobile communication network NW, in accordance with an instruction of the main control section 100. Using such wireless communication, various kinds of file data such as audio data and image data, e-mail data, and the like are transmitted and received, and Web data, streaming data, and the like are received.

The display input section 120 is a so-called touch panel, and includes the display panel 121 and the operation panel 122. The touch panel displays image (still image and moving image) information or text information so as to visually transfer the information to a user in accordance with control of the main control section 100, and detects a user operation on the displayed information.

The display panel 121 uses a liquid crystal display (LCD), an organic electro-luminescence display (OELD), or the like as a display device. The operation panel 122 is a device that is provided to view an image which is displayed on a display screen of the display panel 121 and that detects a single pair of coordinates or a plurality of pairs of coordinates at which an operation is performed by a user's finger or a stylus. When such a device is operated by a user's finger or a stylus, the device outputs a detection signal, which is generated due to the operation, to the main control section 100. Subsequently, the main control section 100 detects an operation position (coordinates) on the display panel 121, on the basis of the received detection signal.

As shown in FIG. 21, the display panel 121 and the operation panel 122 of the smartphone 101, which is exemplified as a photography device according to the embodiment of the present invention, are integrated, constitute the display input section 120, and are disposed such that the operation panel 122 completely covers the display panel 121. When such arrangement is adopted, the operation panel 122 may have a function of also detecting a user operation in a region other than the display panel 121. In other words, the operation panel 122 may include a detection region (hereinafter referred to as a display region) for a part which overlaps with the display panel 121 and a detection region (hereinafter referred to as a non-display region) for the other part at the outer edge which does not overlap with the display panel 121.

It should be noted that a size of the display region and a size of the display panel 121 may completely coincide with each other, but it is not always necessary for both to coincide with each other. Further, the operation panel 122 may include two sensing regions of the outer edge part and the other inside part. Furthermore, a width of the outer edge part is appropriately designed depending on a size of the casing 102 and the like. In addition, examples of the position detection method adopted by the operation panel 122 may include a matrix switch method, a resistance film method, a surface elastic wave method, an infrared method, an electromagnetic induction method, and an electrostatic capacitance method, and the like, and any method may be adopted.

The speech section 130 includes a speaker 131 and a microphone 132. The speech section 130 converts a sound of a user, which is input through the microphone 132, into sound data, which can be processed in the main control section 100, and outputs the data to the main control section 100, or decodes sound data, which is received by the wireless communication section 110 or the external input/output section 160, and outputs the data from the speaker 131. Further, as shown in FIG. 21, for example, the speaker 131 can be mounted on a surface the same as the surface on which the display input section 120 is provided, and the microphone 132 can be mounted on a side surface of the casing 102.

The operation sections 140 are hardware keys using key switches or the like, and receive an instruction from a user. For example, as shown in FIG. 21, the operation sections 140 are button-type switches which are mounted on the side surface of the casing 102 of the smartphone 101. Each switch is turned on if it is pressed by a finger or the like, and is turned off due to restoring force of a spring if the finger is released.

The storage section 150 stores a control program and control data of the main control section 100, application software, address data in which names, phone numbers, and the like of communication partners are associated, received and transmitted e-mail data, Web data which is downloaded by Web browsing, and downloaded contents data, and temporarily stores streaming data and the like. Further, the storage section 150 is constituted of an internal storage portion 151, which is built into the smartphone, and an external storage portion 152 which has a removable external memory slot. In addition, each of the internal storage portion 151 and the external storage portion 152 constituting the storage section 150 is implemented by using a storage medium such as a flash memory type, a hard disk type, a multimedia card micro type, a card type memory (such as a MicroSD (registered trademark) memory), a random access memory (RAM), or a read only memory (ROM).

The external input/output section 160 has a function of an interface with all external devices connected to the smartphone 101. The external input/output section 160 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 101 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, a personal computer which is connected in a wired or wireless manner, an earphone, and the like. The external input/output section is able to transfer the data, which is transmitted from such external devices, to the components within the smartphone 101, and to transmit the data within the smartphone 101 to the external devices.

The GPS receiver 170 receives a plurality of GPS signals, which are transmitted from GPS satellites ST1 to STn, in accordance with instructions of the main control section 100, executes positioning calculation processing based on the received GPS signals, and detects a position formed of a latitude, a longitude, and an altitude of the smartphone 101. The GPS receiver 170 may detect the position by using position information when it is possible to acquire the position information from the wireless communication section 110 or the external input/output section 160 (for example, wireless LAN).

The motion sensor section 180 includes, for example, a triaxial acceleration sensor, and detects physical movement of the smartphone 101, in accordance with an instruction of the main control section 100. By detecting physical movement of the smartphone 101, a speed of acceleration and a direction of the movement of the smartphone 101 are detected. Such detection results are output to the main control section 100.

The power supply section 190 supplies the respective sections of the smartphone 101 with electric power, which is stored in a battery (not shown), in accordance with an instruction of the main control section 100.

The main control section 100 includes a micro processor, and integrally controls the respective sections of the smartphone 101 by performing an operation on the basis of control data or a control program stored in the storage section 150. Further, the main control section 100 has an application processing function and a mobile communication control function of controlling the respective sections of a communication system in order to perform data communication and sound communication through the wireless communication section 110.

The application processing function is implemented by an operation of the main control section 100 using application software stored in the storage section 150. Examples of the application processing function include: an infrared communication function of performing data communication with other devices by controlling the external input/output section 160; an e-mail function of transmitting and receiving e-mails; a Web browsing function of browsing Web pages; and the like.

Further, the main control section 100 has an image processing function of displaying a video on the display input section 120 and the like, on the basis of image data (still image and moving image data) such as received data and downloaded streaming data. The image processing function means a function of causing the main control section 100 to decode the image data, apply image processing to the corresponding decoding result, and display an image on the display input section 120.

Further, the main control section 100 executes display control for the display panel 121 and operation detection control to detect the user operation through the operation sections 140 and the operation panel 122.

Through execution of the display control, the main control section 100 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 121.

Further, through execution of the operation detection control, the main control section 100 detects the user operation performed through the operation section 140, receives an operation performed on the icon or a text input performed in an input field of the window through the operation panel 122, or receives a request to scroll a displayed image through the scroll bar.

Furthermore, the main control section 100 has a touch panel control function performed through execution of the operation detection control. The function determines whether the operation position of the operation panel 122 is in the overlapping part (display region) which overlaps with the display panel 121 or the other part (non-display region) at the outer edge which does not overlap with the display panel 121, and controls the display position of the software key or the sensing region of the operation panel 122.

In addition, the main control section 100 may detect a gesture operation performed on the operation panel 122, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 141 is a digital camera for performing electronic photography by using the imaging element 22 such as a complementary metal oxide semiconductor (CMOS) or a charge-coupled device (CCD). Further, under the control of the main control section 100, the camera section 141 is able to convert the image data, which is obtained through image capturing, into compressed image data such as data of a joint photographic coding experts group (JPEG), and to record the data in the storage section 150 or to output the data through the external input/output section 160 or the wireless communication section 110. In the smartphone 101 shown in FIG. 21, the camera section 141 is mounted on the same side as the display input section 120. However, the mounting position of the camera section 141 is not limited to this. The camera section 141 may be mounted on the rear side of the display input section 120, or a plurality of camera sections 141 may be mounted. In addition, in the case where a plurality of camera sections 141 is mounted, photography may be performed using a single camera section 141 by selecting the camera section 141 for the photography, or photography may be performed using the plurality of camera sections 141 at the same time.

Further, the camera section 141 can be used in various functions of the smartphone 101. For example, an image, which is acquired by the camera section 141, can be displayed on the display panel 121, and an image of the camera section 141 as one of the operation inputs of the operation panel 122 can be used. Further, when the GPS receiver 170 detects a position, the GPS receiver 170 may detect the position with reference to the image acquired from the camera section 141. Furthermore, it may be possible to determine a direction of an optical axis of the camera section 141 of the smartphone 101 or determine a current user environment, using the GPS receiver 170 in combination with the triaxial acceleration sensor or without using the triaxial acceleration sensor, with reference to the image acquired from the camera section 141. Needless to say, the image acquired from the camera section 141 may be used in the application software.

Otherwise, the position information acquired by the GPS receiver 170, the sound information acquired by the microphone 132 (or text information obtained through sound text conversion performed by the main control section or the like), posture information acquired by the motion sensor section 180, and the like may be added to the image data of the still image or the moving image, and the image data may be recorded in the storage section 150, or may be output through the input/output section 160 or the wireless communication section 110.

In the above-mentioned smartphone 101, the image processing section 28 (including the abnormal oblique-incident-light detection portion 34 and the correction portion 36) can be appropriately implemented by, for example, the main control section 100, the storage section 150, and the like.

The scope of the above-mentioned embodiments also includes a processing method of storing a program, which operates the components in the above-mentioned embodiment, in a storage medium, reading the program, which is stored in the storage medium, as codes, and executing the program in a computer so as to implement the above-mentioned embodiment functions. That is, a computer-readable storage medium is also included in the scope of the embodiments. Further, the above-mentioned embodiments include not only the above-mentioned storage medium, in which the computer program is stored, but also the computer program itself As the storage medium, it is possible to use, for example, a floppy (registered trademark) disk, a hard disk, an optical disc, a magneto-optical disc, a CD-ROM, a magnetic tape, a nonvolatile memory card, or a ROM.

Further, the present invention is not limited to executing the processing through a single program stored in the above-mentioned storage medium. The scope of the above-mentioned embodiments also includes executing the operations of the above-mentioned embodiments through the OS in conjunction with functions of an extended board and different software.

It is apparent that the present invention is not limited to the above-mentioned embodiments, and may be modified into various forms without departing from the scope of the present invention.

What is claimed is:

1. An image capture device comprising:
an imaging element that has a plurality of pixels arranged in a first direction and a second direction perpendicular to the first direction, where each of the plurality of pixels has a color filter and a photodiode which receives light transmitted through the color filter and outputs pixel data;
an abnormal oblique-incident-light detection unit that detects incidence of abnormal oblique incident light onto the imaging element on the basis of the pixel data; and
a correction unit that corrects the pixel data of the pixels having the photodiodes, onto which the abnormal oblique incident light is incident, on the basis of a detection result of the abnormal oblique-incident-light detection unit,
wherein the plurality of pixels includes a first first-direction same-color adjacent pixel constituted of a pixel which has the color filter with a first color and is adjacent to a pixel having the color filter with the first color in the first direction, a second first-direction same-color adjacent pixel constituted of a pixel which has the color filter with the first color and is adjacent to a pixel having the color filter with the first color in the first direction, a first first-direction different-color adjacent pixel constituted of a pixel which has the color filter with the first color and is adjacent to a pixel having the color filter with a different color from the first color in the first direction, and a second first-direction different-color adjacent pixel constituted of a pixel which has the color filter with the first color and is adjacent to a pixel having the color filter with the different color from the first color in the first direction, and
wherein the abnormal oblique-incident-light detection unit detects abnormal oblique incident light, which is incident onto the imaging element in the first direction, on the basis of the pixel data of the first first-direction same-color adjacent pixel, the second first-direction same-color adjacent pixel, the first first-direction different-color adjacent pixel, and the second first-direction different-color adjacent pixel.

2. The image capture device according to claim 1,
wherein the plurality of pixels includes a first second-direction same-color adjacent pixel constituted of a pixel which has the color filter with the first color and is adjacent to a pixel having the color filter with the first color in the second direction, a second second-direction same-color adjacent pixel constituted of a pixel which has the color filter with the first color and is adjacent to a pixel having the color filter with the first color in the second direction, a first second-direction different-color adjacent pixel constituted of a pixel which has the color filter with the first color and is adjacent to a pixel having the color filter with a different color from the first color in the second direction, and a second second-direction different-color adjacent pixel constituted of a pixel which has the color filter with the first color and is adjacent to a pixel having the color filter with the different color from the first color in the second direction, and wherein the abnormal oblique-incident-light detection unit detects abnormal oblique incident light, which is incident onto the imaging element in the second direction, on the basis of the pixel data of the first second-direction same-color adjacent pixel, the second second-direction same-color adjacent pixel, the first second-direction different-color adjacent pixel, and the second second-direction different-color adjacent pixel.

3. The image capture device according to claim 2, wherein the abnormal oblique-incident-light detection unit detects the abnormal oblique incident light, which is incident onto the imaging element in the first direction, in case where the pixel data of the first first-direction same-color adjacent pixel and the pixel data of the second first-direction same-color adjacent pixel are the same, and the pixel data of the first first-direction different-color adjacent pixel and the second first-direction different-color adjacent pixel are different from the pixel data of the first first-direction same-color adjacent pixel and the second first-direction same-color adjacent pixel, and wherein the abnormal oblique-incident-light detection unit detects the abnormal oblique incident light, which is incident onto the imaging element in the second direction, in case where the pixel data of the first second-direction same-color adjacent pixel and the pixel data of the second second-direction same-color adjacent pixel are the same, and the pixel data of the first second-direction different-color adjacent pixel and the second second-direction different-color adjacent pixel are different from the pixel data of the first second-direction same-color adjacent pixel and the second second-direction same-color adjacent pixel.

4. The image capture device according to claim 2, wherein N is an integer equal to or greater than 3 and M is an integer equal to or greater than 3, the plurality of pixels includes a plurality of basic array pixel groups each of which has an array of N×M pixels arranged in the first direction and the second direction and which are arranged in parallel in the first direction and the second direction, and wherein each of the basic array pixel groups includes the first first-direction same-color adjacent pixel, the second first-direction same-color adjacent pixel, the first first-direction different-color adjacent pixel, the second first-direction different-color adjacent pixel, the first second-direction same-color adjacent pixel, the second second-direction same-color adjacent pixel, the first second-direction different-color adjacent pixel, and the second second-direction different-color adjacent pixel.

5. The image capture device according to claim 3, wherein N is an integer equal to or greater than 3 and M is an integer equal to or greater than 3, the plurality of pixels includes a plurality of basic array pixel groups each of which has an array of N×M pixels arranged in the first direction and the second direction and which are arranged in parallel in the first direction and the second direction, and wherein each of the basic array pixel groups includes the first first-direction same-color adjacent pixel, the second first-direction same-color adjacent pixel, the first first-direction different-color adjacent pixel, the second first-direction different-color adjacent pixel, the first second-direction same-color adjacent pixel, the second second-direction same-color adjacent pixel, the first second-direction different-color adjacent pixel, and the second second-direction different-color adjacent pixel.

6. The image capture device according to claim 2, wherein the plurality of pixels includes a first first-color pixel and a second first-color pixel that have color filters with the first color, are adjacent in a positive direction of the first direction to pixels having color filters with the same color, and are adjacent in a negative direction of the first direction to pixels having color filters with different colors, a third first-color pixel and a fourth first-color pixel that have color filters with the first color, are adjacent in the negative direction of the first direction to pixels having color filters with the same color, and are adjacent in the positive direction of the first direction to pixels having color filters with the different colors, a fifth first-color pixel and a sixth first-color pixel that have color filters with the first color, are adjacent in a positive direction of the second direction to pixels having color filters with the same color, and are adjacent in a negative direction of the second direction to pixels having color filters with the different colors, and a seventh first-color pixel and an eighth first-color pixel that have color filters with the first color, are adjacent in the negative direction of the second direction to pixels having color filters with the same color, and are adjacent in the positive direction of the second direction to pixels having color filters with the different colors, wherein each of the first first-direction same-color adjacent pixel, the second first-direction same-color adjacent pixel, the first first-direction different-color adjacent pixel, and the second first-direction different-color adjacent pixel is constituted by any of the first first-color pixel, the second first-color pixel, the third first-color pixel, and the fourth first-color pixel, wherein each of the first second-direction same-color adjacent pixel, the second second-direction same-color adjacent pixel, the first second-direction different-color adjacent pixel and the second second-direction different-color adjacent pixel is constituted by any of the fifth first-color pixel, the sixth first-color pixel, the seventh first-color pixel, and the eighth first-color pixel, wherein the abnormal oblique-incident-light detection unit determines which of the positive and negative directions of the first direction the abnormal oblique incident light, which is incident onto the imaging element in the first direction, is incident in, on the basis of the pixel data of the first first-color pixel, the second first-color pixel, the third first-color pixel, and the fourth first-color pixel, and wherein the abnormal oblique-incident-light detection unit determines which of the positive and negative directions of the second direction the abnormal oblique incident light, which is incident onto the imaging element in the second direction, is incident in, on the basis of the pixel data of the fifth first-color pixel, the sixth first-color pixel, the seventh first-color pixel, and the eighth first-color pixel.

7. The image capture device according to claim 3, wherein the plurality of pixels includes a first first-color pixel and a second first-color pixel that have color filters with the first color, are adjacent in a positive direction of the first direction to pixels having color filters with the same color, and are adjacent in a negative direction of the first direction to pixels having color filters with different colors, a third first-color pixel and a fourth first-color pixel that have color filters with the first color, are adjacent in the negative direction of the first direction to pixels having color filters with the same color, and are adjacent in the positive direction of the first direction to pixels having color filters with the different colors, a fifth first-color pixel and a sixth first-color pixel that have color filters with the first color, are adjacent in a positive direction of the second direction to pixels having color filters with the same color, and are adjacent in a negative direction of the second direction to pixels having color filters with the different colors, and a seventh first-color pixel and an eighth first-color pixel that have color filters with the first color, are adjacent in the negative direction of the second direction to pixels having color filters with the same color, and are adjacent in the positive direction of the second direction to pixels having color filters with the different colors, wherein each of the first first-direction same-color adjacent pixel, the second first-direction same-color adjacent pixel, the first first-direction different-color adjacent pixel, and the second first-direction different-color adjacent pixel is constituted by any of the first first-color pixel, the second first-color pixel, the third first-color pixel, and the fourth first-color pixel, wherein each of the first second-direction same-color adjacent pixel, the second second-direction same-color adjacent pixel, the first second-direction different-color adjacent pixel and the second second-direction different-color adjacent pixel is constituted by any of the fifth first-color pixel, the sixth first-color pixel, the seventh first-color pixel, and the eighth first-color pixel, wherein the abnormal oblique-incident-light detection unit determines which of the positive and negative directions of the first direction the abnormal oblique incident light, which is incident onto the imaging element in the first direction, is incident in, on the basis of the pixel data of the first first-color pixel, the second first-color pixel, the third first-color pixel, and the fourth first-color pixel, and wherein the abnormal oblique-incident-light detection unit determines which of the positive and negative directions of the second direction the abnormal oblique incident light, which is incident onto the imaging element in the second direction, is incident in, on the basis of the pixel data of the fifth first-color pixel, the sixth first-color pixel, the seventh first-color pixel, and the eighth first-color pixel.

8. The image capture device according to claim 6, wherein the correction unit corrects the pixel data of the pixels having the photodiodes, onto which the abnormal oblique incident light is incident, by using the pixel data of pixels, each of which outputs the same pixel data, among the first first-color pixel, the second first-color pixel, the third first-color pixel, and the fourth first-color pixel, in case where the abnormal oblique-incident-light detection unit detects the abnormal oblique incident light which is incident onto the imaging element in the first direction, and wherein the correction unit corrects the pixel data of the pixels having the photodiodes, onto which the abnormal oblique incident light is incident, by using the pixel data of pixels, each of which outputs the same pixel data, among the fifth first-color pixel, the sixth first-color pixel, the seventh first-color pixel, and the eighth first-color pixel, in case where the abnormal oblique-incident-light detection unit detects the abnormal oblique incident light which is incident onto the imaging element in the second direction.

9. The image capture device according to claim 6, wherein a color of the color filter of the pixel, which has the color filter with the different color from the first color and is adjacent in the first direction to the first first-direction different-color adjacent pixel, is different from a color of the color filter of the pixel, which has the color filter with the different color from the first color and is adjacent in the first direction to the second first-direction different-color adjacent pixel, and wherein a color of the color filter of the pixel, which has the color filter with the different color from the first color and is adjacent in the second direction to the first second-direction different-color adjacent pixel, is different from a color of the color filter of the pixel, which has the color filters with the different color from the first color and is adjacent in the second direction to the second second-direction different-color adjacent pixel.

10. The image capture device according to claim 2, wherein the plurality of pixels includes first-color pixel groups each of which is constituted of pixels that have color filters with the first color and are formed in an array of 2×2 pixels in the first direction and the second direction, and wherein the pixels constituting the first-color pixel groups include the first first-direction same-color adjacent pixel, the second first-direction same-color adjacent pixel, the first first-direction different-color adjacent pixel, and the second first-direction different-color adjacent pixel, and include the first second-direction same-color adjacent pixel, the second second-direction same-color adjacent pixel, the first second-direction different-color adjacent pixel, and the second second-direction different-color adjacent pixel.

11. The image capture device according to claim 10, wherein the plurality of pixels includes a plurality of basic array pixel groups each of which is constituted of pixels that are formed in an array of 6×6 pixels in the first direction and the second direction, the plurality of basic array pixel groups being arranged in parallel in the first direction and the second direction, wherein each of the basic array pixel groups includes two first sub-arrays and two second sub-arrays each of which is constituted of pixels formed in an array of 3×3 pixels in the first direction and the second direction, wherein each first sub-array has a single pixel which has a color filter with the first color and is disposed at the center of the array, four pixels which have color filters with the first color and are disposed at four corners, two pixels which have color filters with a second color and are disposed in the first direction with the single pixel, which has the color filter with the first color and is disposed at the center of the array, interposed therebetween, and two pixels which have color filters with a third color and are disposed in the second direction with the single pixel, which has the color filter with the first color and is disposed at the center of the array, interposed therebetween, wherein each second sub-array has a single pixel which has a color filter with the first color and is disposed at the center of the array, four pixels which have color filters with the first color and are disposed at four corners, two pixels which have color filters with the third color and are disposed in the first direction with the single pixel, which has the color filter with the first color and is disposed at the center of the array, interposed therebetween, and two pixels which have color filters with the second color and are disposed in the second direction with the single pixel, which has the color filter with the first color and is disposed at the center of the array, interposed therebetween, wherein the first sub-arrays are disposed to be adjacent to the second sub-arrays in the first direction and the second direction, and wherein each first-color pixel group is constituted of the two first sub-arrays and the two second sub-arrays.

12. The image capture device according to claim 10, wherein the plurality of pixels includes a plurality of basic array pixel groups each of which is constituted of pixels that are formed in an array of 4×4 pixels in the first direction and the second direction, the plurality of basic array pixel groups being arranged in parallel in the first direction and the second direction, wherein each of the basic array pixel groups includes two first sub-arrays and two second sub-arrays each of which is constituted of pixels formed in an array of 2×2 pixels in the first direction and the second direction, wherein each first sub-array is constituted of four pixels having color filters with the first color, and each second sub-array is constituted of two pixels having color filters with a second color and two pixels having color filters with a third color, wherein the first sub-arrays are disposed to be adjacent to the second sub-arrays in the first direction and the second direction, and wherein each first-color pixel group is constituted of the first sub-array.

13. The image capture device according to claim 2, wherein the plurality of pixels includes a plurality of basic array pixel groups each of which is constituted of pixels that are formed in an array of 6×6 pixels in the first direction and the second direction, the plurality of basic array pixel groups being arranged in parallel in the first direction and the second direction, wherein each of the basic array pixel groups includes two first sub-arrays and two second sub-arrays each of which is constituted of pixels formed in an array of 3×3 pixels in the first direction and the second direction, wherein each first sub-array has a single pixel which has a color filter with a second color and is disposed at the center of the array, four pixels which have color filters with a third color and are disposed at four corners, and four pixels which have color filters with the first color and which are disposed between each of pixels at the four corners, wherein each second sub-array has a single pixel which has a color filter with the third color and is disposed at the center of the array, four pixels which have color filters with the second color and are disposed at four corners, and four pixels which have color filters with the first color and which are disposed between each of pixels at the four corners, wherein the first sub-arrays are disposed to be adjacent to the second sub-arrays in the first direction and the second direction, wherein the first first-direction same-color adjacent pixel, the second first-direction same-color adjacent pixel, the first first-direction different-color adjacent pixel, and the second first-direction different-color adjacent pixel are constituted of pixels, which have color filters with the first color and are adjacent to each other in the first direction, among pixels which have color filters with the first color in the first sub-arrays and the second sub-arrays which are adjacent in the first direction, and wherein the first second-direction same-color adjacent pixel, the second second-direction same-color adjacent pixel, the first second-direction different-color adjacent pixel, and the second second-direction different-color adjacent pixel are constituted of pixels, which have color filters with the first color and are adjacent to each other in the second direction, among pixels which have color filters with the first color in the first sub-arrays and the second sub-arrays which are adjacent in the second direction.

14. The image capture device according to claim 2, wherein the plurality of pixels includes pixel blocks each of which is formed in an array of 3×3 pixels in the first direction and the second direction, the pixel block being constituted of two pixels which have color filters with a second color and are disposed at two corners of four corners, two pixels which have color filters with a third color and are disposed at the other two corners of the four corners, and five pixels which have color filters with the first color and are arranged in a cross shape in the first direction and the second direction, and wherein the abnormal oblique-incident-light detection unit detects the abnormal oblique incident light, which is incident in the first or second direction onto the imaging element, on the basis of the pixel data of five pixels having color filters with the first color included in the pixel block.

15. The image capture device according to claim 14, wherein the correction unit corrects the pixel data of the pixels having the photodiodes, onto which the abnormal oblique incident light is incident, by using the pixel data of pixels, which have color filters with the first color, and pixels, which are adjacent thereto in the first direction and have color filters with the first color, when the abnormal oblique-incident-light detection unit detects the abnormal oblique incident light which is incident onto the imaging element in the first direction, and wherein the correction unit corrects the pixel data of the pixels having the photodiodes, onto which the abnormal oblique incident light is incident, by using the pixel data of the pixels, which have color filters with the first color, and the pixels, which are adjacent thereto in the second direction and have color filters with the first color, when the abnormal oblique-incident-light detection unit detects the abnormal oblique incident light which is incident onto the imaging element in the second direction.

16. The image capture device according to claim 14, wherein the plurality of pixels includes a plurality of basic array pixel groups each of which is constituted of pixels that are formed in an array of 4×4 pixels in the first direction and the second direction, the plurality of basic array pixel groups being arranged in parallel in the first direction and the second direction, wherein each of the basic array pixel groups includes two first sub-arrays and two second sub-arrays each of which is constituted of pixels formed in an array of 2×2 pixels in the first direction and the second direction, wherein each first sub-array is constituted of three pixels having color filters with the first color and a single pixel having a color filter with the second color, each second sub-array is constituted of three pixels having color filters with the first color and a single pixel having a color filter with the third color, and a position of the pixel having the color filter with the second color in the first sub-array corresponds to a position of the pixel having the color filter with the third color in the second sub-array, wherein the first sub-arrays are disposed to be adjacent to the second sub-arrays in the first direction and the second direction, and wherein the pixel block is constituted of two pixels having color filters with the second color, two pixels having color filters with the third color, and five pixels having color filters with the first color, in each of the basic array pixel groups.

17. The image capture device according to claim 1, wherein the plurality of pixels includes pixels with the first color, which is formed by color filters with at least one or more colors, and pixels with the second color which is formed by color filters with at least two or more colors other than the first color, and wherein the pixels with the first color have the color filters with colors of which ratios of contribution to obtain luminance signals are higher than the ratios of the colors of the color filters of the pixels with the second color, and the pixels, which have color filters with the first color, are constituted of the pixels with the first color.

18. The image capture device according to claim 17, wherein each pixel with the first color has a green, transparent, or white color filter.

19. An image processing method comprising:
detecting incidence of abnormal oblique light onto an imaging element having a plurality of pixels, which are arranged in a first direction and a second direction perpendicular to the first direction and each of which has a color filter and a photodiode receiving light transmitted through the color filter and outputting pixel data, on the basis of the pixel data; and correcting the pixel data of the pixels having the photodiodes, onto which the abnormal oblique incident light is incident, on the basis of a detection result of the detecting of the incidence of the abnormal oblique incident light, wherein the plurality of pixels includes a first first-direction same-color adjacent pixel constituted of a pixel which has the color filter with a first color and is adjacent to a pixel having the color filter with the first color in the first direction, a second first-direction same-color adjacent pixel constituted of a pixel which has the color filter with the first color and is adjacent to a pixel having the color filter with the first color in the first direction, a first first-direction different-color adjacent pixel constituted of a pixel which has the color filter with the first color and is adjacent to a pixel having the color filter with a different color from the first color in the first direction, and a second first-direction different-color adjacent pixel constituted of a pixel which has the color filter with the first color and is adjacent to a pixel having the color filter with the different color from the first color in the first direction, and wherein in the detecting of the incidence of the abnormal oblique incident light, abnormal oblique incident light, which is incident onto the imaging element in the first direction, is detected, on the basis of the pixel data of the first first-direction same-color adjacent pixel, the second first-direction same-color adjacent pixel, the first first-direction different-color adjacent pixel, and the second first-direction different-color adjacent pixel.

20. A non-transitory computer readable medium storing a program for causing a computer to execute:
detecting incidence of abnormal oblique incident light onto an imaging element having a plurality of pixels, which are arranged in a first direction and a second direction perpendicular to the first direction and each of which has a color filter and a photodiode receiving light transmitted through the color filter and outputting pixel data, on the basis of the pixel data; and correcting the pixel data of the pixels having the photodiodes, onto which the abnormal oblique incident light is incident, on the basis of a detection result of the detecting of the incidence of the abnormal oblique incident light, wherein the plurality of pixels includes a first first-direction same-color adjacent pixel constituted of a pixel which has the color filter with a first color and is adjacent to a pixel having the color filter with the first color in the first direction, a second first-direction same-color adjacent pixel constituted of a pixel which has the color filter with the first color and is adjacent to a pixel having the color filter with the first color in the first direction, a first first-direction different-color adjacent pixel constituted of a pixel which has the color filter with the first color and is adjacent to a pixel having the color filter with a different color from the first color in the first direction, and a second first-direction different-color adjacent pixel constituted of a pixel which has the color filter with the first color and is adjacent to a pixel having the color filter with the different color from the first color in the first direction, and wherein in the detecting of the incidence of the abnormal oblique incident light, abnormal oblique incident light, which is incident onto the imaging element in the first direction, is detected, on the basis of the pixel data of the first first-direction same-color adjacent pixel, the second first-direction same-color adjacent pixel, the first first-direction different-color adjacent pixel, and the second first-direction different-color adjacent pixel.

* * * * *